(12) United States Patent
Raveendran et al.

(10) Patent No.: US 10,108,386 B2
(45) Date of Patent: Oct. 23, 2018

(54) CONTENT PROVISIONING FOR WIRELESS BACK CHANNEL

(75) Inventors: Vijayalakshmi R. Raveendran, San Diego, CA (US); Xiaodong Wang, San Diego, CA (US); Fawad Shaukat, San Diego, CA (US); Xiaolong Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 13/364,576

(22) Filed: Feb. 2, 2012

(65) Prior Publication Data

US 2013/0033496 A1 Feb. 7, 2013

Related U.S. Application Data

(60) Provisional application No. 61/439,809, filed on Feb. 4, 2011, provisional application No. 61/579,059, filed on Dec. 22, 2011.

(51) Int. Cl.
*G06F 3/14* (2006.01)

(52) U.S. Cl.
CPC ... *G06F 3/1407* (2013.01); *G09G 2340/0407* (2013.01); *G09G 2370/04* (2013.01); *G09G 2370/16* (2013.01)

(58) Field of Classification Search
CPC .................................................. G06F 3/1407
USPC ........................................................ 345/428
See application file for complete search history.

(56) References Cited

U.S. PATENT DOCUMENTS

| 4,791,554 A | 12/1988 | Hirota et al. |
| 5,828,370 A | 10/1998 | Moeller et al. |
| 5,835,723 A | 11/1998 | Andrews et al. |
| 5,925,137 A | 7/1999 | Okanoue et al. |

(Continued)

FOREIGN PATENT DOCUMENTS

| CN | 1437355 A | 8/2003 |
| CN | 1561609 A | 1/2005 |

(Continued)

OTHER PUBLICATIONS

"Raster Graphics." Wikipedia. Wikimedia Foundation, Jan. 29, 2011. Web. Apr. 1, 2015. <http://en.wikipedia.org/w/index.php?title=Raster_graphics&oldid=410775304>.*

(Continued)

*Primary Examiner* — Vu Nguyen
(74) *Attorney, Agent, or Firm* — Shumaker & Sieffert, P.A.

(57) ABSTRACT

In one example, this disclosure describes a method that includes, in an example, determining, by a source device, that display data rendered by the source device comprises one or more displayable graphical objects. The method also includes in response to determining an event, selecting, by the source device, a set of the one or more graphical objects for rendering at a sink device. The method also includes generating, by the source device, configuration data based at least in part on the set of the one or more graphical objects, wherein the configuration data is usable by the sink device to render representations of graphical objects in the set of one or more graphical objects based at least in part on one or more display parameters associated with the sink device. The method also includes sending, by the source device, the configuration data to the sink device.

36 Claims, 8 Drawing Sheets

(56) References Cited

U.S. PATENT DOCUMENTS

| | | |
|---|---|---|
| 6,014,706 A | 1/2000 | Cannon et al. |
| 6,049,549 A | 4/2000 | Ganz et al. |
| 6,195,680 B1 | 2/2001 | Goldszmidt et al. |
| 6,252,889 B1 | 6/2001 | Patki et al. |
| 6,266,690 B1 | 7/2001 | Shankarappa et al. |
| 6,400,720 B1 | 6/2002 | Ovadia et al. |
| 6,424,626 B1 | 7/2002 | Kidambi et al. |
| 6,515,992 B1 | 2/2003 | Weston et al. |
| 6,594,699 B1 | 7/2003 | Sahai et al. |
| 6,608,841 B1 | 8/2003 | Koodli |
| 6,748,195 B1 | 6/2004 | Phillips |
| 6,760,772 B2 | 7/2004 | Zou et al. |
| 6,801,530 B1 | 10/2004 | Brandt et al. |
| 6,876,857 B1 | 4/2005 | Nee et al. |
| 6,917,976 B1 | 7/2005 | Slaughter et al. |
| 6,963,921 B1 | 11/2005 | Yang et al. |
| 7,035,281 B1 | 4/2006 | Spearman et al. |
| 7,072,984 B1 | 7/2006 | Polonsky et al. |
| 7,080,151 B1 | 7/2006 | Borella et al. |
| 7,085,420 B2 | 8/2006 | Mehrotra |
| 7,099,629 B1 | 8/2006 | Bender |
| 7,324,462 B1 | 1/2008 | Page et al. |
| 7,328,021 B1 | 2/2008 | Satapathy |
| 7,333,464 B2 | 2/2008 | Yang et al. |
| 7,366,204 B2 | 4/2008 | Kang et al. |
| 7,373,415 B1 | 5/2008 | Deshan et al. |
| 7,376,155 B2 | 5/2008 | Ahn et al. |
| 7,477,659 B1 | 1/2009 | Nee et al. |
| 7,519,470 B2 | 4/2009 | Brasche et al. |
| 7,529,823 B2 | 5/2009 | Trufinescu et al. |
| 7,565,357 B2 | 7/2009 | Rao |
| 7,688,859 B2 | 3/2010 | Chen et al. |
| 7,696,980 B1 | 4/2010 | Piot et al. |
| 7,712,670 B2 | 5/2010 | Sauerwein, Jr. et al. |
| 7,716,385 B2 | 5/2010 | Saint-Hilaire et al. |
| 7,719,972 B2 | 5/2010 | Yuan et al. |
| 7,720,096 B2 | 5/2010 | Klemets |
| 7,768,536 B2 | 8/2010 | Hyatt |
| 7,835,406 B2 | 11/2010 | Oran et al. |
| 7,868,890 B2 | 1/2011 | Ludwin et al. |
| 7,881,315 B2 | 2/2011 | Haveson et al. |
| 7,929,475 B2 | 4/2011 | Simonson et al. |
| 8,001,384 B2 | 8/2011 | Yamamoto et al. |
| 8,102,849 B2 | 1/2012 | Martinez et al. |
| 8,157,168 B2 | 4/2012 | Sauerwein, Jr. et al. |
| 8,364,201 B1 | 1/2013 | Fujisaki |
| 8,406,961 B2 | 3/2013 | Pathak et al. |
| 8,428,048 B2 | 4/2013 | Walker et al. |
| 8,437,347 B2 | 5/2013 | Casaccia et al. |
| 8,466,870 B2 | 6/2013 | Cohen et al. |
| 8,517,251 B2 | 8/2013 | Cohen et al. |
| 8,593,996 B2 | 11/2013 | Lee et al. |
| 8,605,048 B2 | 12/2013 | Ye et al. |
| 8,605,584 B2 | 12/2013 | Leung et al. |
| 8,612,619 B2 | 12/2013 | Guo et al. |
| 8,724,696 B2 | 5/2014 | Byford et al. |
| 8,966,131 B2 | 2/2015 | Huang et al. |
| 2002/0007494 A1 | 1/2002 | Hodge |
| 2002/0035621 A1 | 3/2002 | Zintel et al. |
| 2002/0097718 A1 | 7/2002 | Korus et al. |
| 2003/0031152 A1 | 2/2003 | Gohda et al. |
| 2003/0064752 A1 | 4/2003 | Adachi et al. |
| 2003/0110297 A1 | 6/2003 | Tabatabai et al. |
| 2003/0142631 A1 | 7/2003 | Silvester |
| 2003/0152098 A1 | 8/2003 | Zhu |
| 2003/0167171 A1 | 9/2003 | Calderone et al. |
| 2003/0225737 A1 | 12/2003 | Mathews |
| 2004/0039934 A1 | 2/2004 | Land et al. |
| 2004/0071169 A1 | 4/2004 | Abe et al. |
| 2004/0083284 A1 | 4/2004 | Ofek et al. |
| 2004/0103282 A1 | 5/2004 | Meier et al. |
| 2004/0147264 A1 | 7/2004 | Ogawa |
| 2004/0160967 A1 | 8/2004 | Fujita et al. |
| 2004/0202249 A1 | 10/2004 | Lo et al. |
| 2004/0214571 A1 | 10/2004 | Hong |
| 2005/0021810 A1 | 1/2005 | Umemura et al. |
| 2005/0044142 A1 | 2/2005 | Garrec et al. |
| 2005/0058090 A1 | 3/2005 | Chang et al. |
| 2005/0060750 A1 | 3/2005 | Oka et al. |
| 2005/0085239 A1 | 4/2005 | Cedervall |
| 2005/0096086 A1 | 5/2005 | Singamsetty |
| 2005/0102699 A1 | 5/2005 | Kim et al. |
| 2005/0111361 A1 | 5/2005 | Hosein |
| 2005/0130611 A1 | 6/2005 | Lu et al. |
| 2005/0136990 A1 | 6/2005 | Hardacker et al. |
| 2005/0138193 A1 | 6/2005 | Encarnacion et al. |
| 2005/0144225 A1 | 6/2005 | Anderson et al. |
| 2005/0149976 A1 | 7/2005 | Lupoi et al. |
| 2005/0152330 A1 | 7/2005 | Stephens et al. |
| 2005/0166241 A1 | 7/2005 | Kim et al. |
| 2005/0175321 A1 | 8/2005 | Aridome et al. |
| 2005/0176429 A1 | 8/2005 | Lee et al. |
| 2005/0198663 A1 | 9/2005 | Chaney et al. |
| 2005/0219266 A1 | 10/2005 | Koutani et al. |
| 2005/0266798 A1 | 12/2005 | Moloney et al. |
| 2005/0267946 A1 | 12/2005 | An et al. |
| 2005/0271072 A1 | 12/2005 | Anderson et al. |
| 2006/0002320 A1 | 1/2006 | Costa-Requena et al. |
| 2006/0002395 A1 | 1/2006 | Araki et al. |
| 2006/0013182 A1 | 1/2006 | Balasubramanian et al. |
| 2006/0028398 A1 | 2/2006 | Willmore |
| 2006/0050640 A1 | 3/2006 | Jin et al. |
| 2006/0053459 A1 | 3/2006 | Simerly et al. |
| 2006/0058003 A1 | 3/2006 | Lee |
| 2006/0069797 A1 | 3/2006 | Abdo et al. |
| 2006/0098593 A1 | 5/2006 | Edvardsen et al. |
| 2006/0101146 A1 | 5/2006 | Wang |
| 2006/0103508 A1 | 5/2006 | Sato |
| 2006/0133414 A1 | 6/2006 | Luoma et al. |
| 2006/0136963 A1 | 6/2006 | Oh et al. |
| 2006/0146009 A1 | 7/2006 | Syrbe et al. |
| 2006/0187964 A1 | 8/2006 | Li et al. |
| 2006/0198448 A1 | 9/2006 | Aissi et al. |
| 2006/0199537 A1 | 9/2006 | Eisenbach |
| 2006/0202809 A1 | 9/2006 | Lane et al. |
| 2006/0203805 A1 | 9/2006 | Karacali-Akyamac et al. |
| 2006/0206340 A1 | 9/2006 | Silvera et al. |
| 2006/0209787 A1 | 9/2006 | Okuda |
| 2006/0218298 A1 | 9/2006 | Knapp et al. |
| 2006/0222246 A1 | 10/2006 | Murai et al. |
| 2006/0223442 A1 | 10/2006 | Stephens |
| 2006/0233191 A1 | 10/2006 | Pirzada et al. |
| 2006/0236250 A1 | 10/2006 | Gargi |
| 2006/0256851 A1 | 11/2006 | Wang et al. |
| 2006/0268869 A1 | 11/2006 | Boers et al. |
| 2006/0270417 A1 | 11/2006 | Chi |
| 2006/0288008 A1 | 12/2006 | Bhattiprolu et al. |
| 2007/0004387 A1 | 1/2007 | Gadamsetty et al. |
| 2007/0008922 A1 | 1/2007 | Abhishek et al. |
| 2007/0016654 A1 | 1/2007 | Bowles et al. |
| 2007/0022195 A1 | 1/2007 | Kawano et al. |
| 2007/0037600 A1 | 2/2007 | Fukuda |
| 2007/0043550 A1 | 2/2007 | Tzruya |
| 2007/0057865 A1 | 3/2007 | Song et al. |
| 2007/0057885 A1 | 3/2007 | Kurumisawa et al. |
| 2007/0061433 A1 | 3/2007 | Reynolds et al. |
| 2007/0104215 A1 | 5/2007 | Wang et al. |
| 2007/0126715 A1 | 6/2007 | Funamoto |
| 2007/0141984 A1 | 6/2007 | Kuehnel et al. |
| 2007/0141988 A1 | 6/2007 | Kuehnel et al. |
| 2007/0157283 A1 | 7/2007 | Setlur et al. |
| 2007/0162945 A1 | 7/2007 | Mills |
| 2007/0171910 A1 | 7/2007 | Kumar et al. |
| 2007/0182728 A1 | 8/2007 | Fujimori |
| 2007/0211041 A1 | 9/2007 | Lai et al. |
| 2007/0259662 A1 | 11/2007 | Lee et al. |
| 2007/0264988 A1 | 11/2007 | Wilson, Jr. et al. |
| 2007/0264991 A1 | 11/2007 | Jones et al. |
| 2007/0274400 A1 | 11/2007 | Murai et al. |
| 2007/0291636 A1 | 12/2007 | Rajagopal et al. |
| 2007/0292135 A1 | 12/2007 | Guo et al. |
| 2007/0299778 A1 | 12/2007 | Haveson et al. |
| 2008/0005348 A1 | 1/2008 | Kosiba et al. |
| 2008/0013658 A1 | 1/2008 | Lewis et al. |

(56) References Cited

U.S. PATENT DOCUMENTS

| | | |
|---|---|---|
| 2008/0018657 A1 | 1/2008 | Montag |
| 2008/0031210 A1 | 2/2008 | Abhishek et al. |
| 2008/0037506 A1 | 2/2008 | Dharmaraju et al. |
| 2008/0037785 A1 | 2/2008 | Gantman et al. |
| 2008/0045149 A1 | 2/2008 | Dharmaraju et al. |
| 2008/0046944 A1 | 2/2008 | Lee et al. |
| 2008/0109763 A1 | 5/2008 | Lee |
| 2008/0115183 A1 | 5/2008 | Zato et al. |
| 2008/0129879 A1 | 6/2008 | Shao et al. |
| 2008/0130612 A1 | 6/2008 | Gorokhov et al. |
| 2008/0155057 A1 | 6/2008 | Khedouri et al. |
| 2008/0198847 A1 | 8/2008 | Yamagishi et al. |
| 2008/0198848 A1 | 8/2008 | Yamagishi |
| 2008/0205394 A1 | 8/2008 | Deshpande et al. |
| 2008/0211766 A1 | 9/2008 | Westerman et al. |
| 2008/0231595 A1 | 9/2008 | Krantz et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0291863 A1 | 11/2008 | Agren |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1* | 1/2009 | Pasetto ............... 345/1.3 |
| 2009/0010259 A1 | 1/2009 | Sirotkin |
| 2009/0013081 A1 | 1/2009 | Laroia et al. |
| 2009/0031035 A1 | 1/2009 | Dharmaraju et al. |
| 2009/0070404 A1 | 3/2009 | Mazzaferri |
| 2009/0083431 A1 | 3/2009 | Balachandran et al. |
| 2009/0089453 A1* | 4/2009 | Bohan ............... G06F 3/14 709/246 |
| 2009/0091656 A1 | 4/2009 | Kitaru et al. |
| 2009/0094317 A1 | 4/2009 | Venkitaraman |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141180 A1 | 6/2009 | Kondo et al. |
| 2009/0141692 A1 | 6/2009 | Kasslin et al. |
| 2009/0147139 A1 | 6/2009 | Watanabe et al. |
| 2009/0153737 A1 | 6/2009 | Glen |
| 2009/0162029 A1 | 6/2009 | Glen |
| 2009/0189860 A1 | 7/2009 | Su et al. |
| 2009/0191926 A1 | 7/2009 | Doyle |
| 2009/0201423 A1 | 8/2009 | Sugiyama et al. |
| 2009/0252130 A1 | 10/2009 | Sheth et al. |
| 2009/0288125 A1 | 11/2009 | Morioka |
| 2009/0300676 A1 | 12/2009 | Harter, Jr. et al. |
| 2009/0323562 A1 | 12/2009 | Cho et al. |
| 2010/0027467 A1 | 2/2010 | Wu et al. |
| 2010/0073334 A1 | 3/2010 | Cohen et al. |
| 2010/0105334 A1 | 4/2010 | Terry et al. |
| 2010/0118200 A1 | 5/2010 | Gelman et al. |
| 2010/0123826 A1 | 5/2010 | Sagi |
| 2010/0127847 A1 | 5/2010 | Evans et al. |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0153553 A1 | 6/2010 | Sheth et al. |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0245296 A1 | 9/2010 | Sip et al. |
| 2010/0257238 A1 | 10/2010 | Jeon et al. |
| 2010/0257450 A1 | 10/2010 | Go et al. |
| 2010/0269039 A1* | 10/2010 | Pahlavan ............ G06F 3/0481 715/702 |
| 2010/0281103 A1 | 11/2010 | Imai et al. |
| 2010/0289871 A1 | 11/2010 | Tatsuta et al. |
| 2010/0289872 A1 | 11/2010 | Funabiki et al. |
| 2010/0293287 A1 | 11/2010 | Kobayashi |
| 2010/0306344 A1 | 12/2010 | Athas et al. |
| 2010/0329564 A1* | 12/2010 | Hervas ............... G06T 1/20 382/190 |
| 2011/0002255 A1 | 1/2011 | Dharmaraju et al. |
| 2011/0019620 A1 | 1/2011 | Wang |
| 2011/0037447 A1 | 2/2011 | Mair |
| 2011/0051602 A1 | 3/2011 | Matthews et al. |
| 2011/0069720 A1 | 3/2011 | Jacobs et al. |
| 2011/0072473 A1 | 3/2011 | Funabiki et al. |
| 2011/0107388 A1* | 5/2011 | Lee ............... H04L 65/1066 725/118 |
| 2011/0115818 A1 | 5/2011 | Chung et al. |
| 2011/0128442 A1 | 6/2011 | Blanchard et al. |
| 2011/0145879 A1 | 6/2011 | Rajamani et al. |
| 2011/0149806 A1 | 6/2011 | Verma et al. |
| 2011/0157470 A1 | 6/2011 | Tsuruga et al. |
| 2011/0164058 A1* | 7/2011 | Lemay ............... 345/651 |
| 2011/0167176 A1 | 7/2011 | Yew et al. |
| 2011/0167181 A1 | 7/2011 | Minoo et al. |
| 2011/0182195 A1 | 7/2011 | Oikawa |
| 2011/0186138 A1 | 8/2011 | Hanna et al. |
| 2011/0205433 A1 | 8/2011 | Altmann |
| 2011/0216239 A1 | 9/2011 | Raveendran |
| 2011/0216216 A1 | 9/2011 | Begen et al. |
| 2011/0216829 A1 | 9/2011 | Raveendran |
| 2011/0270991 A1* | 11/2011 | Zawacki ............ H04L 63/0861 709/227 |
| 2011/0281557 A1 | 11/2011 | Choi et al. |
| 2011/0314168 A1 | 12/2011 | Bathiche et al. |
| 2012/0036543 A1 | 2/2012 | George et al. |
| 2012/0036549 A1 | 2/2012 | Patel et al. |
| 2012/0038825 A1 | 2/2012 | Kanonich |
| 2012/0044985 A1 | 2/2012 | Tao et al. |
| 2012/0060100 A1 | 3/2012 | Sherwood et al. |
| 2012/0084670 A1* | 4/2012 | Momchilov ............ 715/753 |
| 2012/0099566 A1 | 4/2012 | Laine et al. |
| 2012/0113113 A1 | 5/2012 | Hong |
| 2012/0147799 A1 | 6/2012 | Nagara et al. |
| 2012/0154386 A1 | 6/2012 | Nagara et al. |
| 2012/0162537 A1 | 6/2012 | Maddali et al. |
| 2012/0249575 A1 | 10/2012 | Krolczyk et al. |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0033435 A1 | 2/2013 | Raveendran et al. |
| 2013/0047189 A1 | 2/2013 | Raveendran et al. |
| 2013/0128948 A1 | 5/2013 | Rabii et al. |
| 2013/0139210 A1 | 5/2013 | Huang et al. |
| 2013/0174208 A1 | 7/2013 | Lee et al. |
| 2013/0188632 A1 | 7/2013 | Sheth et al. |
| 2013/0195119 A1 | 8/2013 | Huang et al. |
| 2013/0215142 A1 | 8/2013 | Park |
| 2013/0222301 A1 | 8/2013 | Lee et al. |
| 2013/0227152 A1 | 8/2013 | Lee et al. |
| 2013/0234913 A1 | 9/2013 | Thangadorai et al. |
| 2013/0238702 A1 | 9/2013 | Sheth et al. |
| 2013/0246565 A1 | 9/2013 | Froelicher et al. |
| 2013/0246665 A1 | 9/2013 | Lee et al. |
| 2013/0272628 A1 | 10/2013 | Lee |
| 2013/0297936 A1 | 11/2013 | Khosravi et al. |
| 2013/0304794 A1 | 11/2013 | Verma et al. |
| 2014/0019653 A1 | 1/2014 | Amchislavsky et al. |
| 2014/0022146 A1 | 1/2014 | Thangadorai et al. |
| 2014/0096164 A1 | 4/2014 | Bei et al. |
| 2014/0120829 A1 | 5/2014 | Bhamidipati et al. |
| 2014/0210693 A1 | 7/2014 | Bhamidipati et al. |
| 2014/0372620 A1 | 12/2014 | Vedula et al. |

FOREIGN PATENT DOCUMENTS

| | | |
|---|---|---|
| CN | 1592884 A | 3/2005 |
| CN | 1596004 A | 3/2005 |
| CN | 1656750 A | 8/2005 |
| CN | 1662944 A | 8/2005 |
| CN | 1774106 A | 5/2006 |
| CN | 1832481 A | 9/2006 |

(56) References Cited

FOREIGN PATENT DOCUMENTS

| | | |
|---|---|---|
| CN | 1893356 A | 1/2007 |
| CN | 1983945 A | 6/2007 |
| CN | 101002453 A | 7/2007 |
| CN | 101018330 A | 8/2007 |
| CN | 101083825 A | 12/2007 |
| CN | 101247249 A | 8/2008 |
| CN | 101247250 A | 8/2008 |
| CN | 101663640 A | 3/2010 |
| EP | 1203080 A2 | 5/2002 |
| EP | 1206080 A1 | 5/2002 |
| EP | 1233326 A2 | 8/2002 |
| EP | 1235392 A1 | 8/2002 |
| EP | 1325591 A1 | 7/2003 |
| EP | 1333373 * | 8/2003 ............... G06F 3/14 |
| EP | 1333373 A1 | 8/2003 |
| EP | 1385336 A2 | 1/2004 |
| EP | 1423778 A2 | 6/2004 |
| EP | 1507369 A1 | 2/2005 |
| EP | 1517228 A2 | 3/2005 |
| EP | 1550264 A1 | 7/2005 |
| EP | 1653678 A2 | 5/2006 |
| EP | 1944946 | 7/2008 |
| EP | 1959685 A2 | 8/2008 |
| EP | 1959686 A2 | 8/2008 |
| EP | 2012461 | 1/2009 |
| EP | 2037683 | 3/2009 |
| EP | 2190202 A1 | 5/2010 |
| GB | 2383920 A | 7/2003 |
| JP | H06110424 A | 4/1994 |
| JP | H07104722 A | 4/1995 |
| JP | H07129364 A | 5/1995 |
| JP | H07240806 A | 9/1995 |
| JP | H0837628 A | 9/1996 |
| JP | H09325923 A | 12/1997 |
| JP | 2000278320 A | 10/2000 |
| JP | 2000354031 A | 12/2000 |
| JP | 2001034250 A | 2/2001 |
| JP | 2001282673 A | 10/2001 |
| JP | 2001352533 A | 12/2001 |
| JP | 2002064725 A | 2/2002 |
| JP | 2002142210 A | 5/2002 |
| JP | 2002165248 A | 6/2002 |
| JP | 2002262341 A | 9/2002 |
| JP | 2002330381 A | 11/2002 |
| JP | 2003050761 A | 2/2003 |
| JP | 2003102060 A | 4/2003 |
| JP | 2003124991 A | 4/2003 |
| JP | 2003143237 A | 5/2003 |
| JP | 2003271279 A | 9/2003 |
| JP | 2003304523 A | 10/2003 |
| JP | 2004054783 A | 2/2004 |
| JP | 2004505531 A | 2/2004 |
| JP | 2004086550 A | 3/2004 |
| JP | 2004120441 A | 4/2004 |
| JP | 2004192140 A | 7/2004 |
| JP | 2004199454 A | 7/2004 |
| JP | 2004265329 A | 9/2004 |
| JP | 2004274159 A | 9/2004 |
| JP | 2004531916 A | 10/2004 |
| JP | 2005049666 A | 2/2005 |
| JP | 2005515714 A | 5/2005 |
| JP | 2005142808 A | 6/2005 |
| JP | 2005148450 A | 6/2005 |
| JP | 2005204016 A | 7/2005 |
| JP | 2006500860 A | 1/2006 |
| JP | 2006060448 A | 3/2006 |
| JP | 2006060589 A | 3/2006 |
| JP | 2006060596 A | 3/2006 |
| JP | 2006100885 A | 4/2006 |
| JP | 2006514353 A | 4/2006 |
| JP | 2006121562 A | 5/2006 |
| JP | 2006155327 A | 6/2006 |
| JP | 2006172423 A | 6/2006 |
| JP | 2006197401 A | 7/2006 |
| JP | 2006254328 A | 9/2006 |
| JP | 2006285302 A | 10/2006 |
| JP | 2007043685 A | 2/2007 |
| JP | 2007082070 A | 3/2007 |
| JP | 2007505580 A | 3/2007 |
| JP | 2007088539 A | 4/2007 |
| JP | 2007508783 A | 4/2007 |
| JP | 2007206644 A | 8/2007 |
| JP | 2007271908 A | 10/2007 |
| JP | 2007274150 A | 10/2007 |
| JP | 2007282219 A | 10/2007 |
| JP | 2007316405 A | 12/2007 |
| JP | 2008508600 A | 3/2008 |
| JP | 2008079139 A | 4/2008 |
| JP | 2008191929 A | 8/2008 |
| JP | 2008293361 A | 12/2008 |
| JP | 2008301249 A | 12/2008 |
| JP | 2008547264 A | 12/2008 |
| JP | 2009021698 A | 1/2009 |
| JP | 2009502067 A | 1/2009 |
| JP | 2009033348 A | 2/2009 |
| JP | 2009071580 A | 4/2009 |
| JP | 2009083896 A | 4/2009 |
| JP | 2009147893 A | 7/2009 |
| JP | 2009537051 A | 10/2009 |
| JP | 2010033548 A | 2/2010 |
| JP | 2010068537 A | 3/2010 |
| JP | 2010098344 A | 4/2010 |
| JP | 2010178147 A | 8/2010 |
| JP | 2012044746 A | 3/2012 |
| JP | 2012525773 A | 10/2012 |
| JP | 2014507862 A | 3/2014 |
| KR | 100398610 B1 | 9/2003 |
| KR | 1020050007533 | 1/2005 |
| KR | 20060060717 A | 6/2006 |
| KR | 20080065633 A | 7/2008 |
| RU | 2207723 C1 | 6/2003 |
| RU | 2005113275 A | 10/2005 |
| RU | 2269873 C2 | 2/2006 |
| TW | 496058 | 7/2002 |
| TW | I239179 | 9/2005 |
| TW | 200618653 | 6/2006 |
| TW | 200838310 A | 9/2008 |
| TW | 200943168 A | 10/2009 |
| WO | 0184291 A1 | 11/2001 |
| WO | 02010942 | 2/2002 |
| WO | 0223825 A1 | 3/2002 |
| WO | 0249314 A2 | 6/2002 |
| WO | 03030451 A1 | 4/2003 |
| WO | 03061240 A1 | 7/2003 |
| WO | WO-03104834 A2 | 12/2003 |
| WO | 2004030351 A1 | 4/2004 |
| WO | 2004034646 A1 | 4/2004 |
| WO | 2004051962 A1 | 6/2004 |
| WO | WO-2005107187 A1 | 11/2005 |
| WO | WO-2005109781 A1 | 11/2005 |
| WO | 2006007352 A1 | 1/2006 |
| WO | 2006020304 A2 | 2/2006 |
| WO | 2006135289 A1 | 12/2006 |
| WO | 2007000757 | 1/2007 |
| WO | 2007009876 A1 | 1/2007 |
| WO | 2007021269 | 2/2007 |
| WO | WO-2007013334 A1 | 2/2007 |
| WO | WO-2007033049 A2 | 3/2007 |
| WO | WO-07098425 | 8/2007 |
| WO | 2007133483 A1 | 11/2007 |
| WO | 2007140342 A2 | 12/2007 |
| WO | 2007140344 A2 | 12/2007 |
| WO | 2008027724 A1 | 3/2008 |
| WO | 2008087713 A1 | 7/2008 |
| WO | 2009015322 A2 | 1/2009 |
| WO | WO-2009040918 A1 | 4/2009 |
| WO | WO-2010120878 A2 | 10/2010 |
| WO | WO-2010126727 A2 | 11/2010 |
| WO | 2011002141 A1 | 1/2011 |

(56) References Cited

FOREIGN PATENT DOCUMENTS

| WO | WO-2011003089 A1 | 1/2011 |
|---|---|---|
| WO | WO-2012096546 A2 | 7/2012 |

OTHER PUBLICATIONS

"OpenGL." Wikipedia. N.p., Jan. 25, 2011. Web. <https://en.wikipedia.org/w/index.php?title=OpenGL&oldid=410035677>.*
Casner, S., et al., "Compressing IP/UDP/RTP Headers for Low-Speed Serial Links," IETF Network Working Group, RFC 2508 (Feb. 1999).
Gentric., et al., "RTP Payload Format for MPEG-4 Streams", Internet Engineering Task Force, draft-ietf-avt-mpeg4-multisl-03.txt, Nov. 2001, pp. 13,14,25 and 33.
Handley, M. et al., "SDP: Session Description Protocol" Network Working Group, Request for Comments: 2327, Category: Standards Track. ISI/LBNL, Apr. 1998, pp. 1-42.
Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.
Basso et al., "RTP Payload For,at for MPEG-4 Streams; draft-ietf-avt-mpeg4-multisi-03.txt", vol. avt, No. 3, Nov. 1, 2001, XP015015620, ISSN: 0000-0004.
Brandenburg, et al., AVTCore, RTCP for inter-destination media syncronization, Internet Draft, draft-ietf-avtcore-idms-092.txt, Oct. 31, 2011.
Co-pending U.S. Appl. No. 10/236,657, filed Sep. 6, 2002.
Doerffel T., "User manual iTALC—Intelligent Teaching and Learning with Computers Version 1.0.4", Jan. 29, 2008(Jan. 29, 2008), pp. 1-17, XP55025785, Retrieved from the Internet: URL:http://italc.sourceforge.net/italc-manual-2007-01-29.pdf [retrieved on Apr. 26, 2012] the whole document.
Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC.2002.997206, vol. 4, Apr. 28, 2002 (Apr. 28, 2002), pp. 2036-2042, XP010589844 ISBN: 978-0-7803-7400-3.
IEEE 802.15.3, "Part 15.3: Wireless Medium Access Control (MAC) and Physical Layer (PHY) Specifications for High Rate Wireless Personal Area Networks (WPANs)," IEEE Computer Society, 2003.
International Search Report and Written Opinion—PCT/US2012/023851—ISA/EPO—dated Aug. 28, 2012.
Kwon E., et al., "An idle timeslot reuse scheme for IEEE 802.15.3 high-rate wireless personal area networks" Vehicular Technology Conference, 2005. VTC-2005-Fall. 2005 IEEE 62nd Dallas, TX, USA Sep. 25-28, 2005, Piscataway, NJ, USA, IEEE, Sep. 25, 2005 (Sep. 25, 2005), pp. 715-719, XP010878576, ISBN: 0-7803-9152-7 section 1. Introduction.
McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.
Media Content Distribution (MCD); 3D 1-30 Gaming Graphics Delivery Overview, Technical Report, European Telecommunications Standards Institute (ETSI), 650, Route Des Lucioles ; F-06921 Sophia-Antipolis ; France, vol. MCD, No. V1. 1. 1, Dec. 1, 2010 (Dec. 1, 2010), XP014061814, section 5.
Miller B., et al., "Mapping salutation architecture APIs to Bluetooth service discovery layer," Bluetooth White Paper, [Online} pp. 1-25, Jul. 1, 1999, XP002511956.
Mitrea M., et al., "Novel approaches to 1-30 remote display representations: BiFS-based solution and its deployment within the FP7 MobiThin project", 87. MPEG Meeting; Feb. 2, 2009-Jun. 2, 2009; Lausanne; (Motion Picture Expert Group or ISO/IEC JTC1/SC29/WG11),, No. M16058, Jan. 29, 2009 (Jan. 29, 2009), XP030044655, sections 2 and 3.
MSDN DirectShow, retrieved Nov. 28, 2011 from: http://msdn.microsoft.com/en-us/library/dd375454(VS.85).aspx.
MSDN Windows Sockets 2, retrieved Nov. 28, 2011 from: http://msdn.microsoft.com/en-us/library/ms740673(VS.85).aspx.
Myers, et al: "Collaboration Using Multiple PDAS Connected to a PC," Proceedings of the ACM Conference on Computer Supported Cooperative Work (CCSW), Nov. 14, 1998, pp. 285-294, ISBN: 978-1-58113-009-6.
Nave I et al., "Games@large graphics streaming architecture", Consumer Electronics, 2008. ISCE 2008. IEEE International Symposium on, IEEE, Piscataway, NJ, USA, Apr. 14, 2008 (Apr. 14, 2008), pp. 1-4, XP031283619, ISBN: 978-1-4244-2422-1 abstract col. 2-col. 6.
Nordbotten, N.A. et al., "Methods for service discovery in Bluetooth scatternets," Computer Communications, Elsevier Science Publishers BV, Amdsterdam, NL, vol. 27, No. 11, Jul. 1, 2004, pp. 1087-1096, XP004503638.
Schulzrinne, et al., "RTP: A Transport Protocol for Real-Time Applications", rfc3550.txt, Jul. 1, 2003, XP015009332, ISSN: 0000-0003.
Shoji Y., et al., "Research and Standardization activty for IEEE802.15.3c mmW WPAN: (2) Target applications and Usage Models", IEICE Tech. Rep., vol. 106, No. 555, RCS2006-279, pp. 179-182, Feb. 2007.
Video Electronics Standards Association (VESA) Mobile Display Digital Interface Standard (MDDI), Jul. 2004.
Wenger et al., "RTP Payload Format for H.264 Video," Network Working Group, RFC 3984, Feb. 2005, 78 pp.
Yin Z., et al., "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005 (Oct. 3, 2005), pp. 902-911, XP010890303.
"Bluetooth Specification Version 1.1" published Feb. 22, 2001; Section 1 pp. 41-42; Section 2.1, p. 43; Section 4.1-2, pp. 47-50; Section 10.9, p. 120; and Section 11, pp. 126-137.
Byungjoo Lee, U.S. Appl. No. 61/433,942, filed Jan. 18, 2011.
Taiwan Search Report—TW096140444—TIPO—Sep. 16, 2013.
Taiwan Search Report—TW098111391—TIPO—Nov. 1, 2013.
DDJ., "Research on Windows Programming with Visual C++, Final Issue, Overcoming WIN32 Hook Processing in MFC Programming", Feb. 1996 issue (vol. 5,No. 2, No. 61 in all), Shoeisha Co., Ltd., Feb. 1, 1996, pp. 66-77.
International Preliminary Report on Patentability—PCT/US2013/020155, The International Bureau of WIPO—Geneva, Switzerland, Jul. 17, 2014.
Hayakawa A., "Operate multiple machines by remote control software", VNCThing, Mac Power, Japan, ASCII Corporation, Jun. 1, 2003, vol. 14, No. 6, p. 86.
Kinoshita K., "The Software" Everyone knows, Read this and everything will be clear, Standard software with freedom., Mac Fan, Japan, Mainichi Communications Inc., Sep. 1, 2007, vol. 15, No. 9, pp. 212-219.
Ryo Yamaichi, Good to Remember! "Wisdom" for Troubleshooting, 68th Windows Q & A Hotline, Windows Server World, Japan, IDG Japan, Inc., Oct. 1, 2009, vol. 14, No. 10, pp. 104-107.
Wikipedia entry for UPnP List of UPnP AV media servers and clients (captured Aug. 20, 2010), pp. 1-10, Retrieved from the Internet , whole document.
Wikipedia entry of header (captured Aug. 30, 2010), 1 Page, Retrieved from the Internet , whole document.
Wallace G., "SharedAppVNC", Oct. 12, 2007, XP55494282, Retrieved from the Internet: URL:https://web.archive.org/web/20071012104103/http://shared-app-vnc.sourceforge.net/ [retrieved on Jul. 20, 2018].

* cited by examiner

CONTENT PROVISIONING FOR WIRELESS BACK CHANNEL

This application claims priority to U.S. Provisional Application No. 61/439,809 entitled "WI-FI DISPLAY REVERSE CHANNEL SETUP AND INPUT DATA ENCAPSULATION," filed Feb. 4, 2011, and U.S. Provisional Application No. 61/579,059 entitled "CONTENT PROVISIONING FOR WIRELESS BACK CHANNEL," filed Dec. 22, 2011, the entire contents of which are hereby incorporated by reference in their entirety.

TECHNICAL FIELD

This disclosure relates to techniques for transmitting data between a wireless source device and a wireless sink device.

BACKGROUND

Wireless display (WD) or Wi-Fi Display (WFD) systems include a source device and one or more sink devices. The source device and each of the sink devices may be either mobile devices or wired devices with wireless communication capabilities. As mobile devices, for example, one or more of the source device and the sink devices may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices. As wired devices, for example, one or more of the source device and the sink devices may comprise televisions, desktop computers, monitors, projectors, and the like, that include wireless communication capabilities.

The source device sends media data, such as audio video (AV) data, to one or more of the sink devices participating in a particular media share session. The media data may be played back at both a local display of the source device and at each of the displays of the sink devices. More specifically, each of the participating sink devices renders the received media data on its screen and audio equipment.

SUMMARY

The techniques of this disclosure generally relate to communication between a wireless source device and a wireless sink device. For example, certain aspects of this disclosure relate to enabling a wireless source device to render content at a wireless sink device using wireless communication. According to some aspects of the disclosure, the wireless source device may share graphical content for rendering at the wireless sink device using wireless communication techniques. In addition, aspects of this disclosure relate to enabling the wireless sink device to act as a second display for the wireless source device. In addition, aspects of this disclosure relate to enabling the source device to offload an application being executed by the source device, such that the application is then executed by the sink device.

In an example, aspects of this disclosure relate to a method comprising: determining, by a source device, that display data rendered by the source device comprises one or more displayable graphical objects; in response to determining an event, selecting, by the source device, a set of the one or more graphical objects for rendering at a sink device; generating, by the source device, configuration data based at least in part on the set of the one or more graphical objects, wherein the configuration data is usable by the sink device to render representations of graphical objects in the set of one or more graphical objects based at least in part on one or more display parameters associated with the sink device; and sending, by the source device, the configuration data to the sink device.

In another example, aspects of this disclosure relate to a wireless source device comprising: a memory storing instructions; one or more processors configured to execute the instructions, wherein upon execution of the instructions the one or more processors cause: determining that display data rendered by the source device comprises one or more displayable graphical objects; in response to determining an event, selecting a set of the one or more graphical objects for rendering at a sink device; generating configuration data based at least in part on the set of the one or more graphical objects, wherein the configuration data is usable by the sink device to render representations of graphical objects in the set of one or more graphical objects based at least in part on one or more display parameters associated with the sink device; and sending the configuration data to the sink device.

In another example, aspects of this disclosure relate to a computer-readable storage medium storing instructions that upon execution by one or more processors of a wireless source device cause the one or more processors to: determine that display data rendered by the source device comprises one or more displayable graphical objects; in response to determining an event, select a set of the one or more graphical objects for rendering at a sink device; generate configuration data based at least in part on the set of the one or more graphical objects, wherein the configuration data is usable by the sink device to render representations of graphical objects in the set of one or more graphical objects based at least in part on one or more display parameters associated with the sink device; and send the configuration data to the sink device.

In another example, aspects of this disclosure relate to a wireless source device comprising: means for determining that display data rendered by the source device comprises one or more displayable graphical objects; means for selecting, in response to determining an event, a set of the one or more graphical objects for rendering at a sink device; means for generating configuration data based at least in part on the set of the one or more graphical objects, wherein the configuration data is usable by the sink device to render representations of graphical objects in the set of one or more graphical objects based at least in part on one or more display parameters associated with the sink device; and means for sending the configuration data to the sink device.

In another example, aspects of this disclosure relate to a method comprising: receiving, by a sink device, configuration data usable by the sink device to render representations of a set of graphical objects, wherein the set of graphical objects is selected by a source device in response to an event; and rendering, by the sink device, the representations of the set of graphical objects using the configuration data based at least in part on one or more display parameters associated with the sink device.

In another example, aspects of this disclosure relate to a wireless sink device comprising: a memory storing instructions; one or more processors configured to execute the instructions, wherein upon execution of the instructions the one or more processors cause: receiving configuration data usable by the sink device to render representations of a set of graphical objects, wherein the set of graphical objects is selected by a source device in response to an event; and rendering the representations of the set of graphical objects using the configuration data based at least in part on one or more display parameters associated with the sink device.

In another example, aspects of this disclosure relate to a computer-readable storage medium storing instructions that upon execution by one or more processors of a wireless sink device cause the one or more processors to: upon receiving configuration data usable by the sink device to render representations of a set of graphical objects, wherein the set of graphical objects is selected by a source device in response to an event, render the representations of the set of graphical objects using the configuration data based at least in part on one or more display parameters associated with the sink device.

In another example, aspects of this disclosure relate to a wireless sink device comprising: means for receiving configuration data usable by the sink device to render representations of a set of graphical objects, wherein the set of graphical objects is selected by a source device in response to an event; and means for rendering the representations of the set of graphical objects using the configuration data based at least in part on one or more display parameters associated with the sink device.

The details of one or more examples are set forth in the accompanying drawings and the description below. Other features, objects, and advantages will be apparent from the description and drawings, and from the claims.

DETAILED DESCRIPTION

Wireless display (WD) systems may include a wireless display (WD) source and one or more wireless display sinks. In general, a wireless display source ("source device") may send audio video (AV) data to a wireless display sink ("sink device"), which may render the received AV data at a terminal device. The AV data, in some examples, may include a sequence of frames (or pictures) played in rapid succession, which may also include associated audio frames, although sometimes audio frames are not included.

In some cases, the source device may be prompted to respond to user inputs applied at a sink device. In such an interactive application, the user inputs applied at the sink device may be sent back to the source device. In one example, a reverse channel architecture may be implemented to enable the wireless display system to transmit the user inputs applied at the sink device to the source device. The reverse channel architecture may include upper layer messages for transporting user inputs and lower layer frames for negotiating user interface capabilities at the sink device and the source device.

The wireless display reverse channel may reside above the Internet Protocol (IP) transport layer between a wireless display sink and the wireless display source. To promote reliable transmission and in sequence delivery to user inputs, the wireless display reverse channel may be configured run on top of TCP/IP. In some cases, there may be a mismatch between the user input interfaces at a sink device and a source device. To resolve the problems induced by such a mismatch and to promote a good user experience under such circumstances, user input interface capability negotiations occur between a sink device and a source device.

Aspects of this disclosure relate to enabling a source device to share graphical content for rendering at a sink device. In addition, aspects of this disclosure relate to enabling a sink device to act as a second display for a source device. Aspects of this disclosure also relate to enabling a source device to offload an application being executed by the source device, such that the application is then executed by a sink device.

Figure 1A:
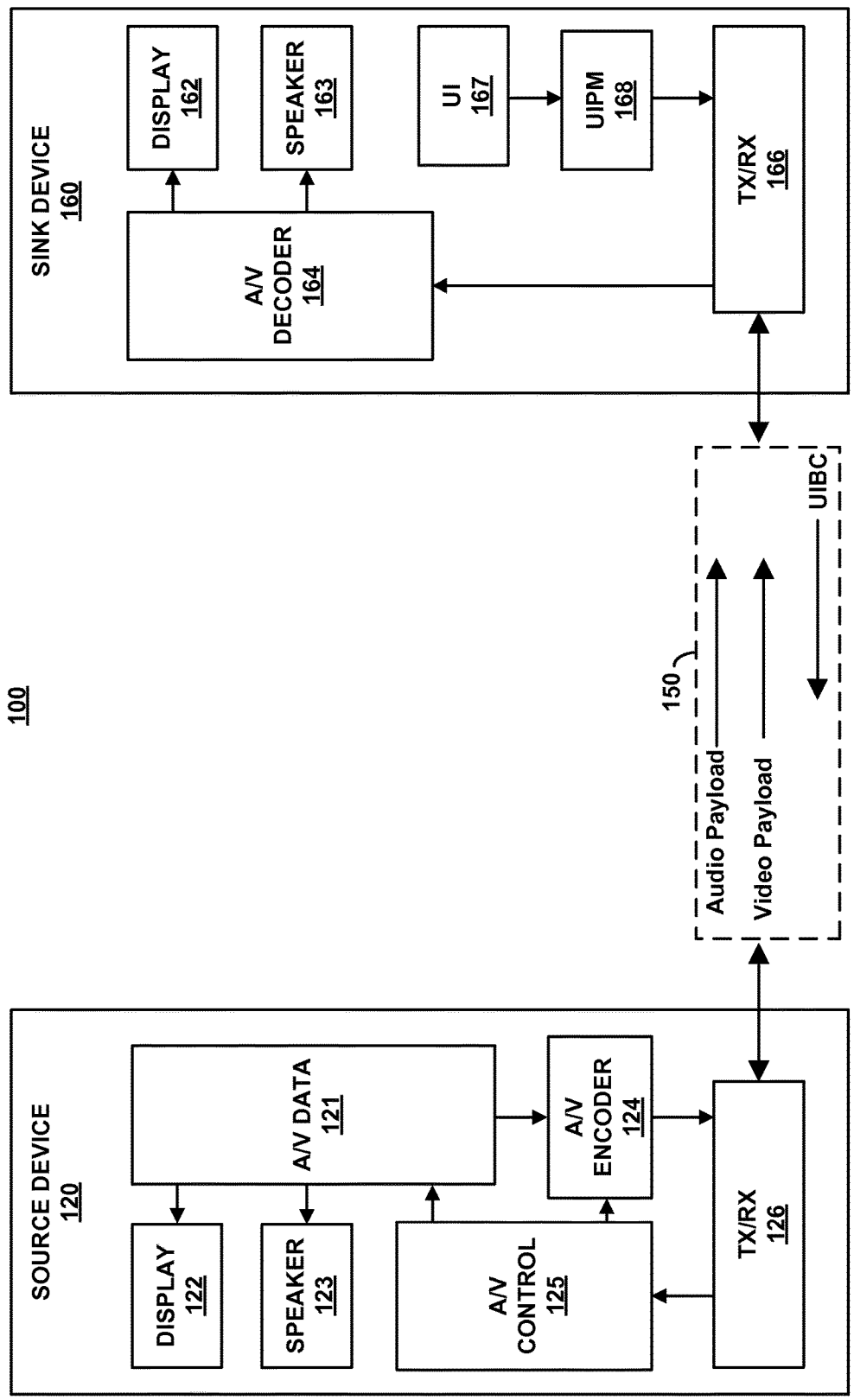
FIG. 1A is a block diagram illustrating an example of a source/sink system having a source device and a sink device, which may implement techniques of this disclosure.

FIG. 1A is a block diagram illustrating an exemplary source/sink system 100 that may implement techniques of this disclosure. As shown in FIG. 1, system 100 includes source device 120 that communicates with sink device 160 via communication channel 150. Source device 120 may include a memory that stores audio/video (AN) data 121, display 122, speaker 123, audio/video encoder 124 (also referred to as encoder 124), audio/video control module 125, and transmitter/receiver (TX/RX) unit 126. Sink device 160 may include display 162, speaker 163, audio/video decoder 164 (also referred to as decoder 164), transmitter/receiver unit 166, user input (UI) device 167, and user input processing module (UIPM) 168. The illustrated components constitute merely one example, and other examples may include fewer components than those illustrated or additional components.

In the example of FIG. 1, source device 120 can display the video portion of audio/video data 121 on display 122 and can output the audio portion of audio/video data 121 on speaker 122. Audio/video data 121 may be stored locally on source device 120, accessed from an external storage medium such as a file server, Blu-ray disc, or DVD, or may be streamed to source device 120 via a network connection such as the internet. In some instances audio/video data 121 may be captured in real-time via a camera and microphone of source device 120. Audio/video data 121 may include multimedia content such as movies, television shows, or music, but may also include real-time content generated by source device 120. Such real-time content may for example be produced by applications running on source device 120. Such real-time content may also include, in one example, a video frame of user input options available for a user to select. In some instances, audio/video data 121 may include video frames that are a combination of different types of content, such as a video frame of a movie or TV program that has user input options overlaid the frame of video.

In addition to rendering audio/video data 121 locally via display 122 and speaker 123, audio/video encoder 124 of source device 120 can encode audio/video data 121, and transmitter/receiver unit 126 can transmit the encoded data over communication channel 150 to sink device 160. Transmitter/receiver unit 166 of sink device 160 receives the encoded data, and audio/video decoder 164 decodes the encoded data and outputs the decoded data via display 162 and speaker 163. In this manner, the audio and video data being rendered by display 122 and speaker 12 can be simultaneously rendered by display 162 and speaker 163. The audio data and video data may be arranged in frames, and the audio frames may be time-synchronized with the video frames when rendered.

Audio/video encoder 124 and audio/video decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard, sometimes called the H.265 standard. Generally speaking, audio/video decoder 164 is configured to perform the reciprocal coding operations of audio/video encoder 124. Although not shown in FIG. 1, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

Although, FIG. 1 shows communication channel 150 carrying audio payload data and video payload data separately, it is to be understood that in some instances video payload data and audio payload data may be part of a common data stream. If applicable, MUX-DEMUX units may conform to the ITU H.223 multiplexer protocol, or other protocols such as the user datagram protocol (UDP). Audio/video encoder 124 and audio/video decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of audio/video encoder 124 and audio/video decoder 164 may be included in one or more encoders or decoders, either of which may be integrated as part of a combined encoder/decoder (CODEC).

Display 122 and display 162 may comprise any of a variety of video output devices such as a cathode ray tube (CRT), a liquid crystal display (LCD), a plasma display, a light emitting diode (LED) display, an organic light emitting diode (OLED) display, or another type of display device. In these or other examples, the display device may be an emissive display or a transmissive display. Speaker 123 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, display 162 may be a television, speaker 163 may be a surround sound system, and decoder 164 may be part of an external box connected, either wired or wirelessly, to display 162 and speaker 163. In other instances, sink device 160 may be a single device, such as a tablet computer or smartphone. In still other cases, source device 160 and sink device 120 are similar devices, e.g., both being smartphones, tablet computers, or the like. In this case, one device may operate as the source and the other may operate as the sink. These rolls may even be reversed in subsequent communication sessions.

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, similar to WiFi, Bluetooth, or the like. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a local area network, a wide-area network, or a global network such as the Internet. Source device 120 and sink device 160 may communicate over communication channel using a communications protocol such as a standard from the IEEE 802.11 family of standards.

In addition to decoding and rendering data received from source device 120, sink device 160 can also receive user inputs from user input device 167. User input device 167 may, for example, be a keyboard, mouse, trackball or track pad, touch screen, voice command recognition module, another type of human device interface (HDI) unit or device, or any other such user input device. User input processing module 168, formats user input commands received by user input device 167 into a data packet structure that source device 120 is capable of interpreting. Such data packets are transmitted by transmitter/receiver 166 to source device 120 over communication channel 150. Transmitter/receiver unit 126 receives the data packets, and A/V control module parses the data packets to interpret the user input command that was received by user input device 167. Based on the command received in the data packet, A/V control module 125 can change the content being encoded and transmitted. In this manner, a user of sink device 160 can control the audio payload data and video payload data being transmitted by source device 120 remotely and without directly interacting with source device 120. Examples of the types of commands a user of sink device 160 may transmit to source device 120 include commands for rewinding, fast forwarding, pausing, and playing audio and video data, as well as commands for zooming, rotating, scrolling, and so on. Users may also make selections, from a menu of options for example, and transmit the selection back to source device 120. Commands may be application-specific or platform-specific, or may comprise general commands applicable to multiple platforms or multiple applications.

Source device 120 can respond to user inputs applied at sink device 160. In such an interactive application setting, the user inputs applied at sink device 160 may be sent back to the wireless display source over communication channel 150. In one example, a reverse channel architecture, also referred to as a user interface back channel (UIBC) may be implemented to enable sink device 160 to transmit the user inputs applied at sink device 160 to source device 120. The reverse channel architecture may include upper layer messages for transporting user inputs and lower layer frames for negotiating user interface capabilities at sink device 160 and source device 120. The UIBC may reside over the Internet Protocol (IP) transport layer between sink device 160 and source device 120. To promote reliable transmission and in sequence delivery of data packets containing user input data, UIBC may be configured run on top of other packet-based communication protocols such as the transmission control protocol/internet protocol (TCP/IP) or the user datagram protocol (UDP).

In some cases, there may be a mismatch between the user input interfaces located at source device 120 and sink device 160. To resolve the potential problems created by such a mismatch and to promote a good user experience under such circumstances, user input interface capability negotiation may occur between source device 120 and sink device 160 prior to establishing a communication session.

The UIBC may be designed to transport various types of user input data, including cross-platform user input data. For example, source device 120 may run the iOS® operating system, while sink device 160 runs another operating system such as Android® or Windows®. Regardless of platform, UIPM 168 can encapsulate received user input in a form understandable to A/V control module 125. A number of different types of user input formats may be supported by the UIBC so as to allow many different types of source and sink devices to exploit the protocol. Generic input formats may be defined, and platform specific input formats may both be supported, thus providing flexibility in the manner in which user input can be communicated between source device 120 and sink device 160 by the UIBC.

In the example of FIG. 1, source device 120 may comprise a smartphone, tablet computer, laptop computer, desktop computer, WiFi enabled television, or any other device capable of transmitting audio and video data. Sink device 160 may likewise comprise a smartphone, tablet computer, laptop computer, desktop computer, WiFi enabled television, or any other device capable of receiving audio and video data and receiving user input data. In some instances, sink device 160 may include a system of devices, such that display 162, speaker 163, UI device 167, and A/V encoder 164 all parts of separate but interoperative devices. Source device 120 may likewise be a system of devices rather than a single device. In many cases, source device 120 and sink device 160 may be similar or identical device, with one device operating as the source and the other operating as the sink. Moreover, these roles may be reversed in different communication sessions.

Aspects of this disclosure relate to enabling source device 120 to share graphical content for rendering at sink device 160. In addition, aspects of this disclosure relate to enabling sink device 160 to act as a second display for source device 120. Aspects of this disclosure also relate to enabling source device 120 to offload an application being executed by source device 120, such that the application is then executed by sink device 160.

To share graphical content, source device 120 may initially establish a wireless connection with sink device 160. In some examples, sink device 160 may include a Graphics Processing Unit (GPU) for rendering graphics data. Accordingly, in response to establishing the wireless connection, source device 120 may receive information that describes the GPU of sink device 160 (e.g., such as information describing GPU capabilities). As source device 120 renders graphical content, source device 120, using techniques of this disclosure, may generate configuration data that represents graphical objects included in the graphical content.

In general, configuration data may represent graphical objects included in the graphical content without providing actual pixel-level data (e.g., pixel values of a particular colorspace). Graphical objects may include, for example, objects comprised of one or more geometric primitives that form a shape for display. Configuration data may require fewer bits than pixel-level display data to represent graphical content. In some examples, configuration data may be similar to OpenGL instructions or instructions of another GPU language. The configuration data may also include graphical commands to modify or manipulate graphical objects. Thus, instead of mirroring display data at a pixel-level, graphical objects (e.g., overlays) and/or graphics commands may be extracted and extended over a wireless connection from source device 120 to sink device 160.

According to the techniques of this disclosure, source device 120 may send configuration data to sink device 160 rather than pixel-level display data. Upon receiving the configuration data, sink device 160 (e.g., the GPU of sink device 160) may use the configuration data to render graphical content at sink device 160. In this way, the source/sink system can leverage the rendering capabilities of sink device 160, rather than relaying solely on source device 120 to process and produce all pixel-level data.

In some examples, source device 120 may also generate configuration data that includes commands to modify or manipulate the graphical objects at sink device 160. For instance, if a user provides a user input to source device 120 to increase the size of a graphical object, source device 120, using techniques of the disclosure, may generate configuration data that describes the increase in size of the graphical object. The configuration may be sent to sink device 160, which may use the configuration data to modify and/or manipulate the corresponding graphical object (e.g., increase the size of the graphical object). That is, upon receiving the configuration data from source device 120, the GPU of sink device 160 may use the configuration data to modify graphical content rendered at sink device 160. According to aspects of this disclosure, as noted above, the configuration data describing the modification to the graphical content may require fewer bits than updated pixel-level display data to represent changes to graphical content.

According to some examples, source device 120 may generate configuration data based on the capabilities of sink device 160. That is, for example, source device 120 may generate configuration data that is interpretable by and/or specific to the capabilities and design of the GPU of sink device 160. Thus, source device 120 may share more of the rendering load with sink device 160 having relatively powerful rendering capabilities than sink device 160 having relatively simplistic rendering capabilities.

In some examples, techniques of the present disclosure may enable source device 120 and sink devices 160 to operate in various different modes. For instance, one mode may cause source device 120 to generate and send configuration data to sink device 160, while in a different mode source device 120 may send pixel-level display data. In another mode, source device 120 may send a combination of pixel-level display data for some graphical objects and configuration data for other graphical objects.

In this way, aspects of this disclosure may be implemented to conserve power at source device 120 (e.g., due to a reduced computational load associated with rendering pixel-level data). In addition, aspects of this disclosure may be implemented to use less bandwidth, as the configuration data typically comprises fewer bits than pixel-level data. In some examples, latency associated with rendering and/or modifying graphical content at sink device 160 (from source device 120) may also be reduced.

Moreover, the techniques of the disclosure may provide improved display quality of graphical content shared between source device 120 and sink device 160 in situations in which source device 120 and sink device 160 have different rendering capabilities. That is, in some instances, source device 120 may have a lower display resolution than sink device 160. In an example for purposes of illustration, source device 120 may be a mobile device (e.g., a tablet or smartphone), while sink device 160 may be a larger television (e.g., a liquid crystal display (LCD) or other television). In such an example, if sink device 160 receives pixel-level display data from source device 120, sink device 160 may be required to upscale or otherwise modify the pixel-level graphical content to the native resolution of sink device 160. According to aspects of this disclosure, sink device 160 may instead receive configuration data (e.g., rather than pixel-level data). Thus, sink device 160 may use the configuration data to generate graphical content in the native resolution of sink device 160, thereby providing a higher quality display of the graphical content.

As noted above, aspects of this disclosure also relate to enabling sink device 160 to act as a second display, which may also be referred to as a "secondary display" for source device 120. That is, rather than mirroring all content from source device 120 to sink device 160, aspects of this disclosure relate to sharing some content between source device 120 and sink device 160 such that sink device 160 may display certain graphical objects not displayed at source device 120. In some examples, a user may select one or more graphical objects being rendered at source device 120 to be shared for rendering on sink device 160. In other examples, an application may automatically determine one or more graphical objects being rendered at source device 120 to be shared for rendering on sink device 160.

In some examples, source device 120 may map a display resolution of source device 120 to sink device 160. For example, when source device 120 and sink device 160 initially communicate, the devices may exchange display resolution information. Accordingly, source device 120 may select different sets of graphical objects for rendering at sink device 160 based on the resolution of sink device 160. For instance, if the resolution of sink device 160 is relatively high, source device 120 may send a first set of graphical objects to sink device 160. If, however, the resolution of sink device 160 is relatively low, source device 120 may send a second set of graphical objects to sink device 160 that includes fewer graphical objects than the first set. More generally, using techniques of the disclosure, source device 120 may determine, based on any capability (e.g., resolution) of sink device 160, which graphical elements are sent from source device 120 to sink device 160.

In one example, source device 120 (e.g., a mobile device such as a tablet or smartphone) may render video data associated with a movie using a movie player application being executed by source device 120. The user may provide user input that causes source device 120 to share video data representing the movie on sink device 160 (e.g., a LCD television). The user input may additionally cause graphical controls of the movie player to be rendered at source device 120, without being rendered at sink device 160. In this way, techniques of the present disclosure may enable source device 120 to render a first portion of graphical content on source device 120 and a second portion of the graphical content on sink device 160. To render the second portion of the graphical content at sink device 160, source device 120 may generate configuration data usable by sink device 160 to render the graphical content. By sending the configuration data to sink device 160, the second portion of graphical content may be rendered at sink device 160.

As noted above, aspects of this disclosure also relate to enabling source device 120 to offload an application being executed by source device 120, such that the application is then executed by sink device 160. For example, source device 120 may be initially executing a particular application. The user may then provide a user input to offload execution of the application onto sink device 160. In such examples, source device 120 may request certain information from sink device 160 regarding the capabilities of sink device 160. In response to the request, sink device 160 may send information to source device 120 that indicates capabilities of sink device 160. For instance, capabilities may include the operating system of sink device 160, applications installed on sink device 160, and data indicating the computing performing of sink device 160.

In an example, in response to a request to offload an application to sink device 160, source device 120 may determine that another instance of the application running on source device 120 is also stored on sink device 160. In such examples, source device 120 may send information to sink device 160 that identifies the application. The information may further include data previously used by the application on source device 120 that will be used by the application on sink device 160. Upon receiving the application information, sink device 160 may execute the application on sink device 160. That is, sink device 160 may launch the application at sink device 160. In addition, sink device 160 may use the application information received from source device 120 to transition to the same state as the application being executed by source device 120.

In some examples, one or more processes associated with offloading applications or other processes from source device 120 to sink device 160 may be performed automatically. For example, rather, source device 120 and sink device 160 may exchange information regarding the capabilities of sink device 160 automatically. That is, in an example, sink device 160 may send information regarding the capabilities of sink device 160 automatically upon establishing a connection with source device 120. Additionally or alternatively, rather than waiting for a request from a user to offload an application to sink device 160, source device 120 may automatically may an application offload determination. For example, upon establishing a connection and determining the capabilities of sink device 160, source device 120 may offload certain applications or other processes that source device 120 determines that sink device 160 has the ability to execute.

Figure 1B:
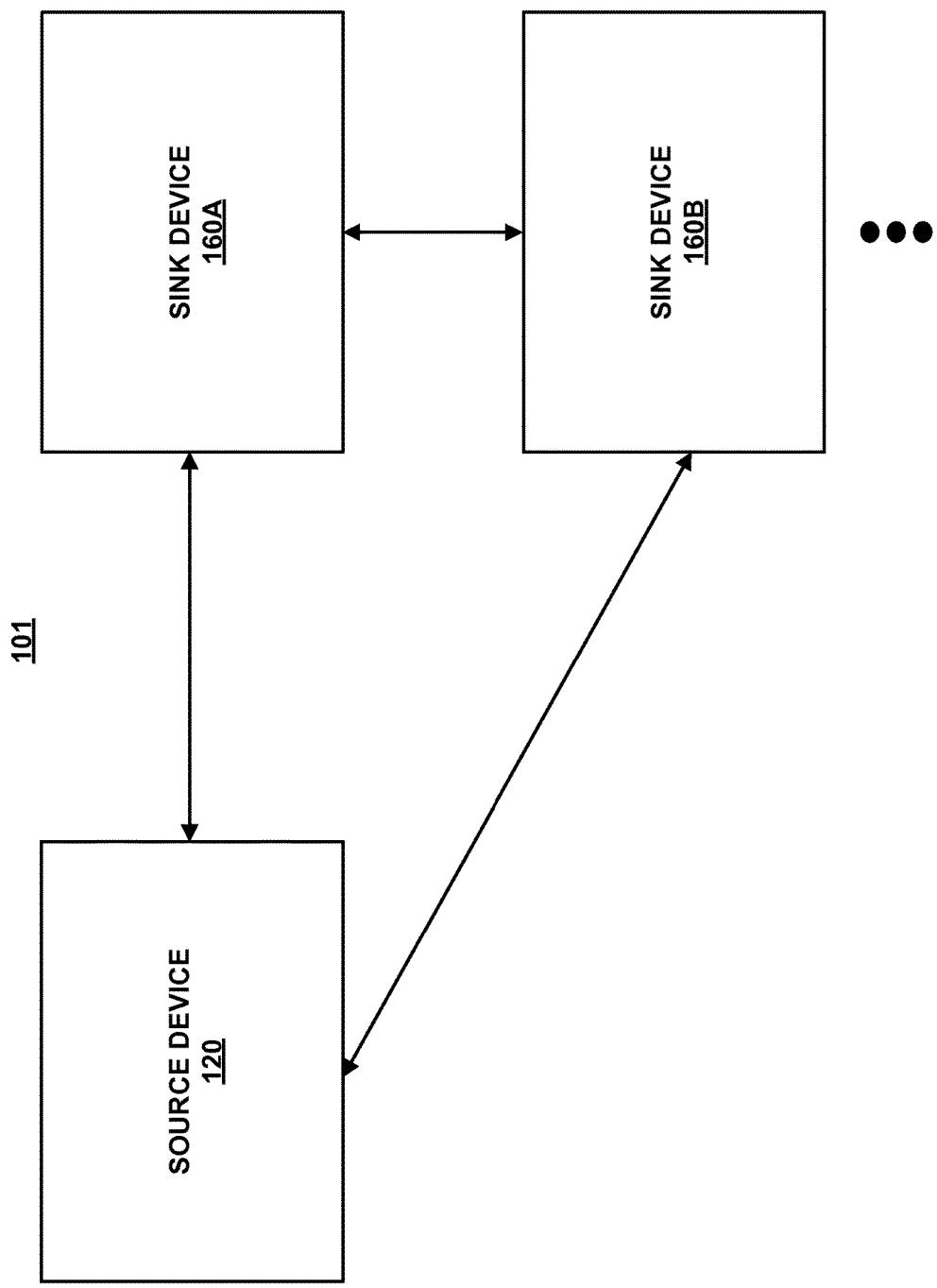
FIG. 1B is a block diagram illustrating an example of a source/sink system with more than one sink device, which may implement techniques of this disclosure.

In some examples, source device 120 may communicate with more than one sink device 160 (e.g., as shown and described, for example, with respect to FIG. 1B). That is, for example, user input may be received by source device 120 from multiple sink devices 160 to modify graphical content rendered by source device 120. Consequently, when events representing the user inputs are transported from multiple sink devices 160 to source device 120, synchronization issues may arise. For instance, display data rendered by source device 120 may be sent to one or more sink devices 160 for rendering. A user may provide a user input from a first sink device 160, which may generate an event that is sent to source device 120. Prior to source device 120 receiving the event, another user may provide a user input at source device 120. In such examples, to facilitate such communication, timestamps may be applied to each user input. The timestamps may be used to synchronize the manner in which user inputs are applied to the display data rendered by source device 120. For instance, a first user input with an earlier timestamp may be applied prior to a second user input with a later timestamp.

FIG. 1B is a block diagram illustrating an exemplary source/sink system 101 that may implement techniques of this disclosure. Source/sink system 101 includes source device 120, sink device 160A, and sink device 160B (collectively, sink devices 160). In some examples, source device 120 and sink devices 160 may function and operate in the manner described above with respect to FIG. 1A. That is, in a similar manner as described with respect to sink device 160 shown in FIG. 1A, sink devices 160A and 160B may receive audio and video data from source device 120. For example, in some configurations, audio and video output at source device 120 may be simultaneously output at sink device 160A and sink device 160B.

Thus, in general, it should be understood that the techniques of this disclosure may be extended to support multiple source and/or sink devices. That is, according to aspects of this disclosure, as described above with respect to FIG. 1A, source device 120 may share graphical content for rendering at any or all of sink devices 160. Additionally or alternatively, any or all of sink devices 160 may act as secondary displays for source device 120. Additionally or alternatively, source device 120 may offload one or more applications being executed by source device 120 to sink device 160A, sink device 160B, or any other sink device in communication with source device 120.

While sink device 160A and sink device 160B have been assigned like numerals, it should be understood that, in some examples, sink device 160A and sink device 160B may have different capabilities and/or perform different functions. For example, in some configurations, sink device 160A may be a primary sink device and sink device 160B may be a secondary sink device. In such a configuration, sink device 160A and sink device 160B may be coupled, and sink device 160A may display video data while sink device 160B outputs corresponding audio data.

Figure 2:
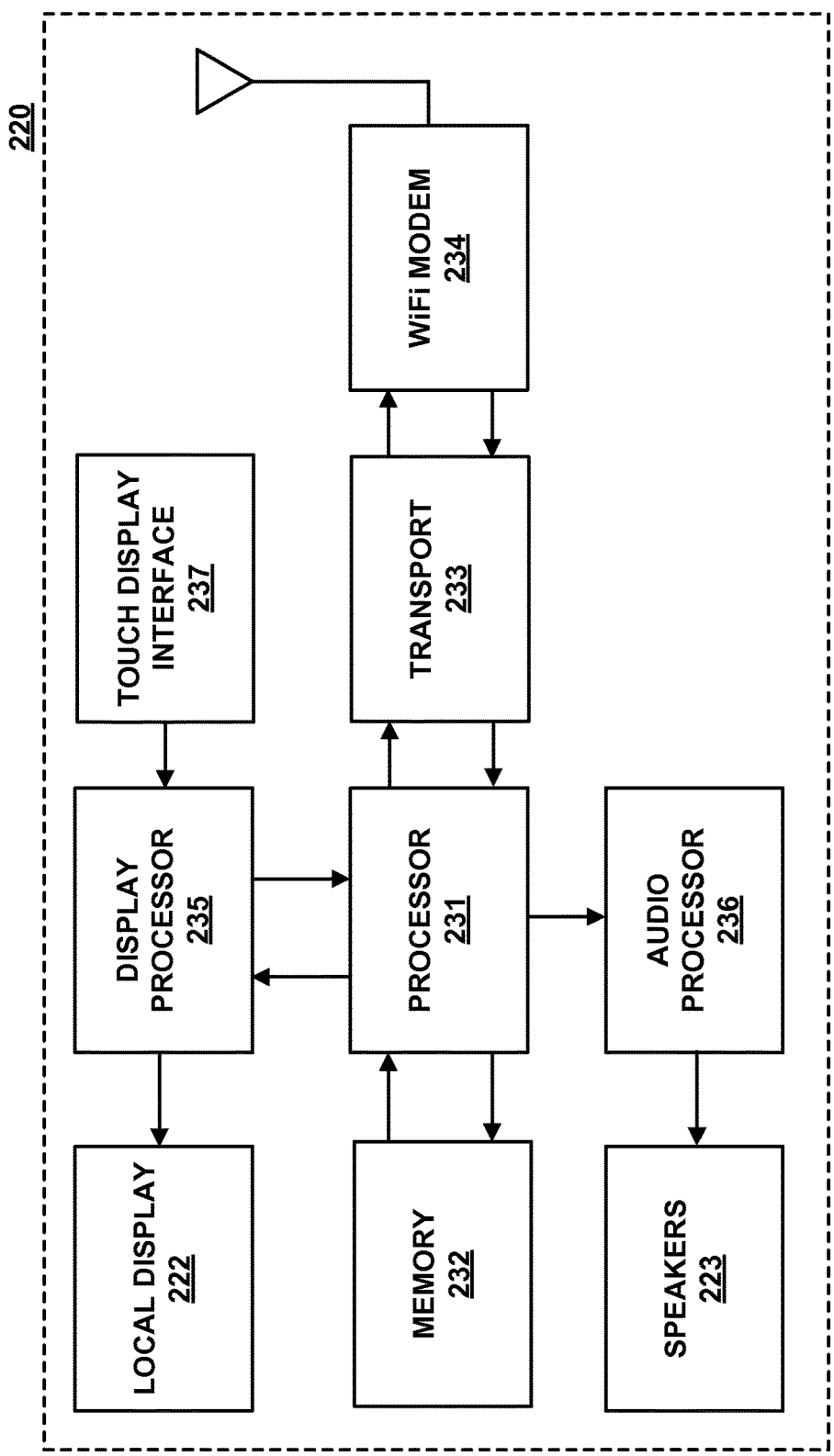
FIG. 2 is a block diagram that shows an example of a source device, which may implement techniques of this disclosure.

FIG. 2 is a block diagram showing one example of a source device 220, such as source device 120 in FIG. 1. Source device 220 includes local display 222, local speaker 223, processors 231, memory 232, transport module 233, and wireless modem 234. As shown in FIG. 2, source 220 device may include one or more processors (i.e. processor 231) that encode and/or decode A/V data for transport, storage, and display. The A/V data may for example be stored at memory 232. Memory 232 may store an entire A/V file, or may comprise a smaller buffer that simply stores a portion of an A/V file, e.g., streamed from another device or source. Transport module 233 may process encoded A/V data for network transport. For example, encoded A/V data may be processed by multimedia processors 231 and encapsulated by transport module 233 into Network Access Layer (NAL) units for communication across a network. The NAL units may be sent by wireless modem 234 to a sink device via a network connection.

Source device 220 may also locally process and display A/V data. In particular display processor 235 may process video data to be displayed on local display 222, audio processor 236 may process audio data for output on speaker 223.

As described above with reference to source device 120 of FIG. 1, source device 220 may also receive user input commands from a sink device. In this manner, wireless modem 234 of source device 220 receives encapsulated data packets, such as NAL units, and sends the encapsulated data units to transport unit 233 for decapsulation. For instance, transport unit 233 may extract data packets from the NAL units, and processor 231 can parse the data packets to extract the user input commands. Based on the user input commands, processor 231 can adjust the encoded A/V data being transmitted by source device 220 to a sink device.

Processor 231 of FIG. 2 generally represents any of a wide variety of processors, including but not limited to one or more digital signal processors (DSPs), general purpose microprocessors, application specific integrated circuits (ASICs), field programmable logic arrays (FPGAs), other equivalent integrated or discrete logic circuitry, or some combination thereof. Memory 232 of FIG. 2 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 232 may additionally store instructions and program code that are executed by processor 231 as part of performing the various techniques described in this disclosure.

Figure 3:
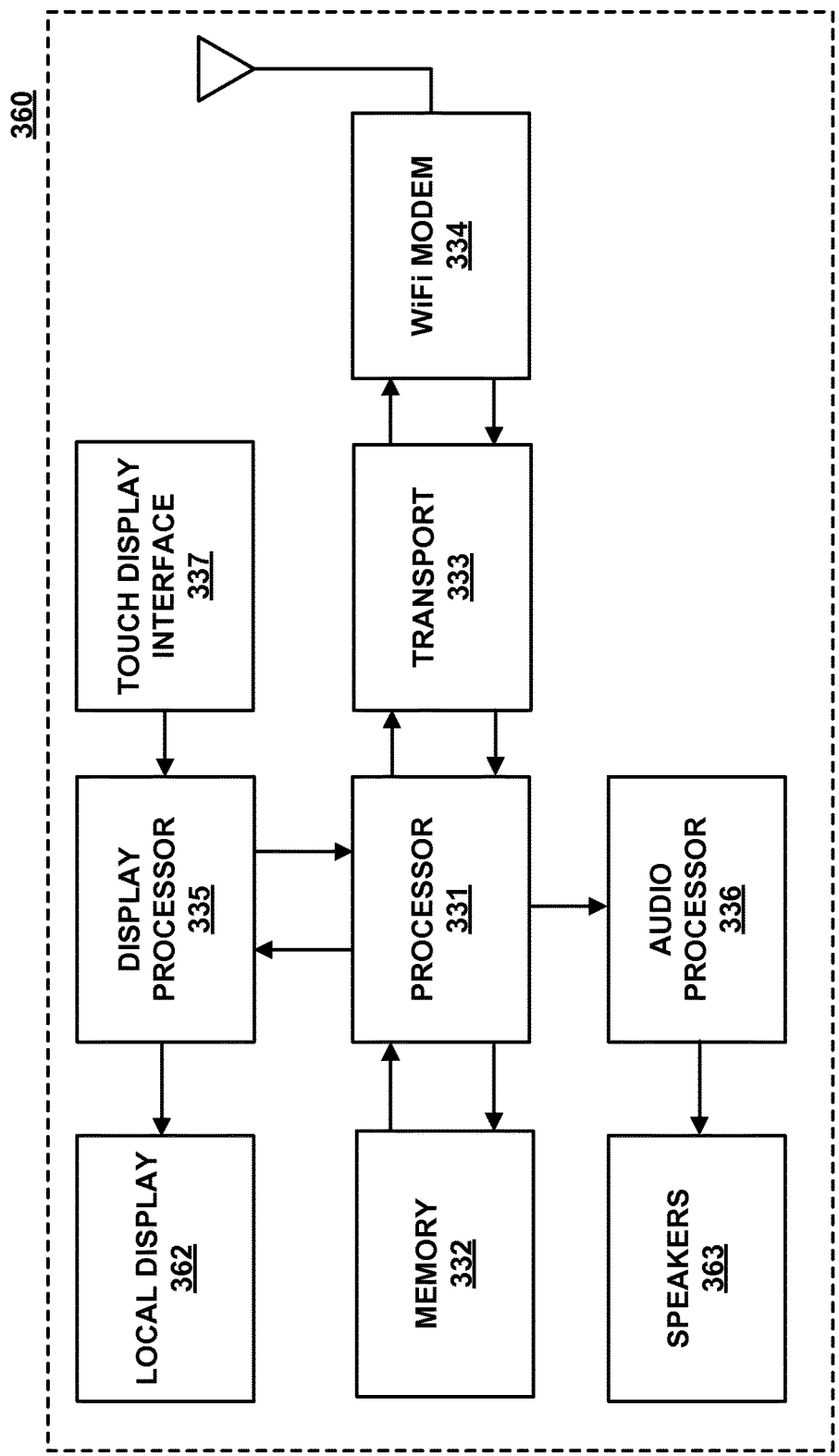
FIG. 3 is a block diagram that shows an example of a sink device, which may implement techniques of this disclosure.

FIG. 3 shows an example of a sink device 360, such as sink device 160 in FIG. 1. Sink device 360 includes processor 331, memory 332, transport unit 333, wireless modem 334, display processor 335, local display 362, audio processor 336, speaker 363, and touch display interface 336. Sink device 360 receives at wireless modem 334 encapsulated data units sent from a source device. Transport unit 333 can decapsulate the encapsulated data units. For instance, transport unit 333 may extract encoded video data from the encapsulated data units and send the encoded A/V data to processor 331 to be decoded and rendered for output. Display processor 335 may process decoded video data to be displayed on local display 362, and audio processor 336 may process decoded audio data for output on speaker 363.

In addition to rendering audio and video data, sink device 360 can also receive user input through touch display interface 336. Although the example of FIG. 3 utilizes a touch display interface as an example input device, other input devices such as keyboards, mouse, or voice command modules are all compatible with the techniques of this disclosure. User input received through touch display interface 336 can be processed by processor 331. This processing may include generating data packets that included the received user input command in accordance with the techniques described in this disclosure. Once generated, transport module 333 may process the data packets for network transport to a wireless source device over a UIBC.

Processor 331 of FIG. 3 may comprise one or more of a wide range of processors, such as one or more digital signal processors (DSPs), general purpose microprocessors, application specific integrated circuits (ASICs), field programmable logic arrays (FPGAs), other equivalent integrated or discrete logic circuitry, or some combination thereof. Memory 332 of FIG. 3 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 332 may additionally store instructions and program code that are executed by processor 331 as part of performing the various techniques described in this disclosure.

Figure 4:
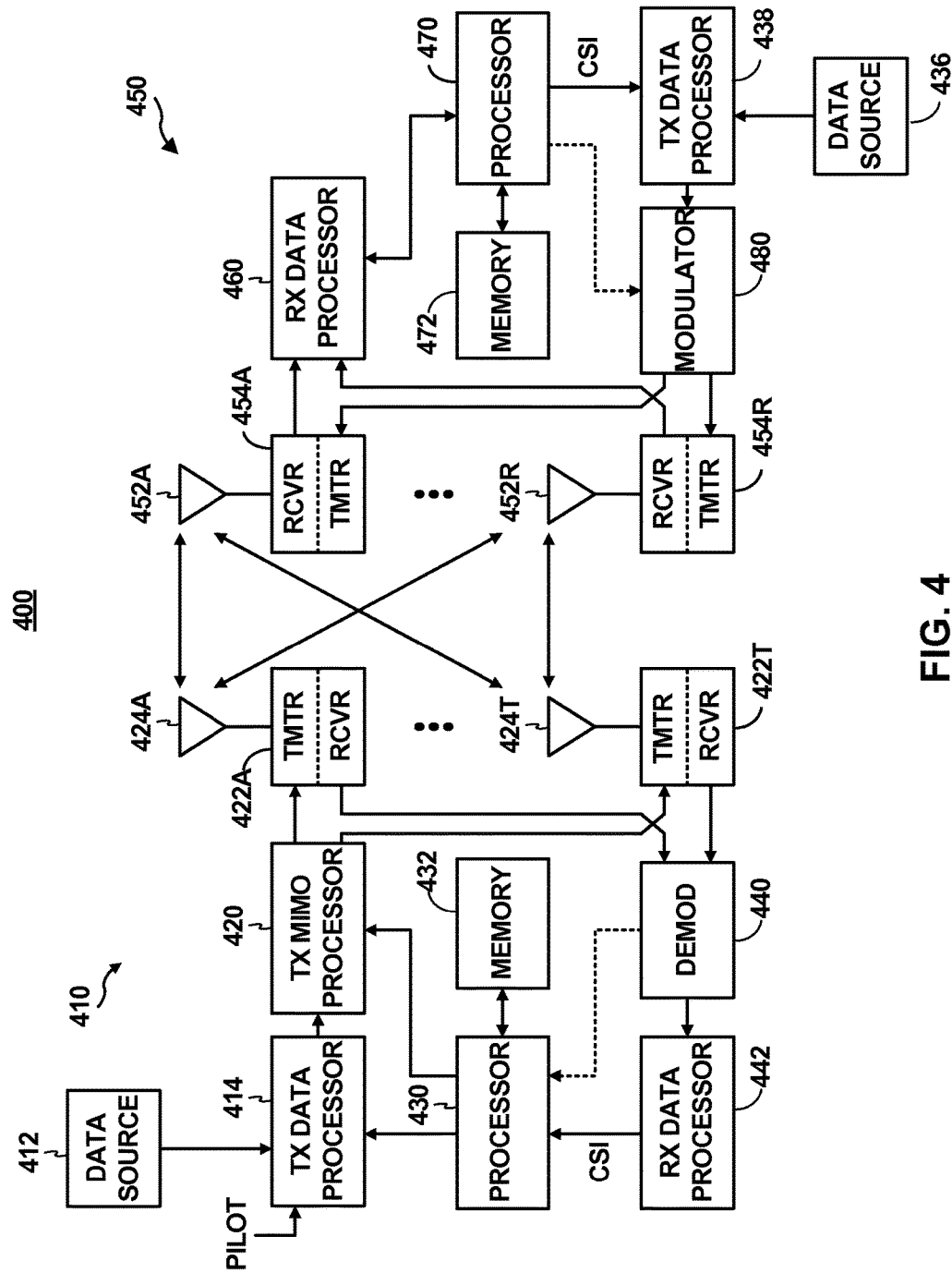
FIG. 4 is a block diagram that shows an example of a transmitter system and a receiver system, which may implement techniques of this disclosure.

FIG. 4 shows a block diagram of an example transmitter system 410 and receiver system 450, which may be used by transmitter/receiver 126 and transmitter/receiver 166 of FIG. 1 for communicating over communication channel 150. At transmitter system 410, traffic data for a number of data streams is provided from a data source 412 to a transmit (TX) data processor 414. Each data stream may be transmitted over a respective transmit antenna. TX data processor 414 formats, codes, and interleaves the traffic data for each data stream based on a particular coding scheme selected for that data stream.

The coded data for each data stream may be multiplexed with pilot data using orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

Consistent with FIG. 4, the pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 430 which may be coupled with memory 432.

The modulation symbols for the data streams are then provided to a TX MIMO processor 420, which may further process the modulation symbols (e.g., for OFDM). TX MIMO processor 420 can then provides NT modulation symbol streams to NT transmitters (TMTR) 422a through 422t. In certain aspects, TX MIMO processor 420 applies beamforming weights to the symbols of the data streams and to the antenna from which the symbol is being transmitted.

Each transmitter 422 may receive and process a respective symbol stream to provide one or more analog signals, and further conditions (e.g., amplifies, filters, and upconverts) the analog signals to provide a modulated signal suitable for transmission over the MIMO channel. NT modulated signals from transmitters 422a through 422t are then transmitted from NT antennas 424a through 424t, respectively.

At receiver system 450, the transmitted modulated signals are received by NR antennas 452a through 452r and the received signal from each antenna 452 is provided to a respective receiver (RCVR) 454a through 454r. Receiver 454 conditions (e.g., filters, amplifies, and downconverts) a respective received signal, digitizes the conditioned signal to provide samples, and further processes the samples to provide a corresponding "received" symbol stream.

A receive (RX) data processor 460 then receives and processes the NR received symbol streams from NR receivers 454 based on a particular receiver processing technique to provide NT "detected" symbol streams. The RX data processor 460 then demodulates, deinterleaves and decodes each detected symbol stream to recover the traffic data for the data stream. The processing by RX data processor 460 is complementary to that performed by TX MIMO processor 420 and TX data processor 414 at transmitter system 410.

A processor 470 that may be coupled with a memory 472 periodically determines which pre-coding matrix to use. The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beamforming weights then processes the extracted message.

Figure 5:
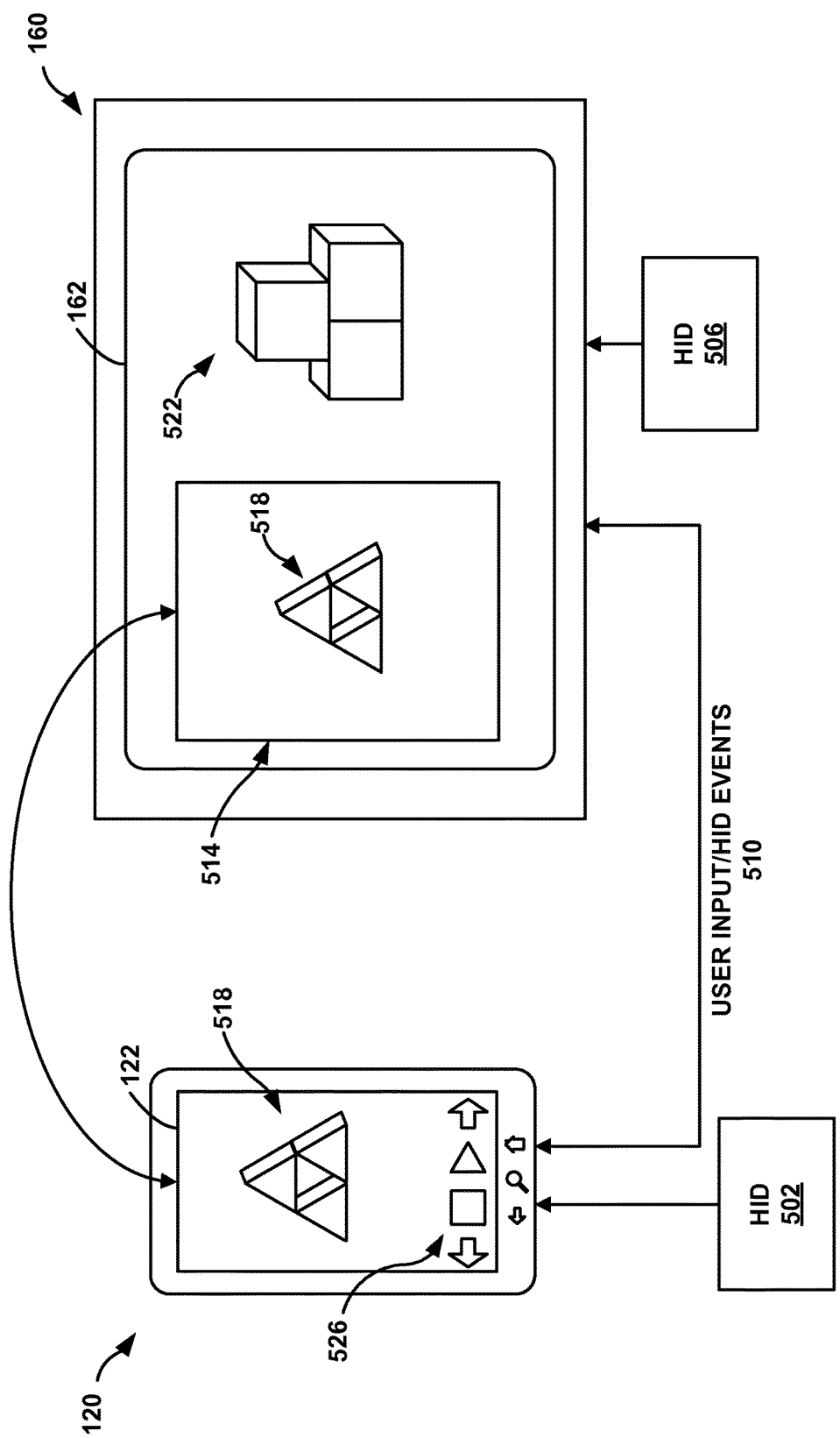
FIG. 5 is a schematic diagram illustrating an example wireless communication between a source device and a sink device, according to aspects of this disclosure.

FIG. 5 is a schematic diagram illustrating an example wireless communication between a source device and a sink device, according to aspects of this disclosure. While FIG. 5 is described with respect to source device 120 and sink device 160 (FIG. 1A), it should be understood that the techniques of FIG. 5 may be performed by a variety of devices, including other source and sink devices.

In the example shown in FIG. 5, display 122 of source device 120 is configured as a touch sensitive display. For example, display 122 may be a capacitive, resistive, or other type of touch panel that allows a user to provide user input to source device 120.

Thus, when a user provides a user input at display 122, source device 120 may generate one or more events that correspond to the user input. In some examples, display 122 may be designed to simultaneously recognize touches at more than one point, a feature commonly referred to as "multi-touch." Multi-touch displays may separately identify and interpret touches in different areas of the screen. In addition to display 122, according to the example shown in FIG. 5, source device 120 may receive input from another source, such as one or more human interface devices (HIDs) 502. Example, HIDs 502 include a keyboard, mouse, trackball or track pad, touch screen, voice command recognition module, or any other such user input device.

In some examples, display 162 of sink device 160 may also be touch sensitive. That is, for example, display 162 may also be a capacitive, resistive, or other type of touch panel that allows a user to provide user input to source device 120. In some examples, display 162 may comprise a multi-touch display. Moreover, as shown in the example of FIG. 5, sink device 160 may also receive input from another source, such as one or more human interface devices (HIDs) 506.

According to aspects of this disclosure, source device 120 may send one or more events to sink device 160 (represented by line 510). For example, source device 120 may send certain events associated with user input at source device 120 to sink device 160. That is, the events may correspond to user input provided to display 122 and/or provided via HIDs 502. Likewise, in some examples, sink device 160 may send certain events associated with user input at sink device 160 to source device 120. Such events may correspond to user input provided to display 162 and/or provided via HIDs 506. In some examples, source device 120 may use Real-time Transport Protocol (RTP) and User Datagram Protocol (UDP) to send events to sink device 160. In other examples, source device 120 may use Transmission Control Protocol (TCP) and Internet Protocol (IP) to send events to sink device 160.

In some examples, sink device 160 may render data from source device 120 on only a portion of display 162 of sink device. That is, for example, sink device 160 may designate an area 514 in which to render graphical content 518 from source device 120. In some examples, as described in greater detail below, graphical content 518 may be displayed on display 162 in the same or in a different resolution than on display 122. Moreover, in some examples, sink device 160 may simultaneously render and display other graphical content 522 that is natively generated at sink device 160 on another portion of display 162.

As shown in FIG. 5, according to some aspects of this disclosure, source device 120 may share graphical content 518 for rendering at sink device 160. For example, source device 120 may, using techniques of this disclosure, generate configuration data that represents graphical objects included in the graphical content 518. In general, as noted above, configuration data may represent graphical objects included in the graphical content without providing actual pixel data. Moreover, the configuration data may represent the graphical objects using fewer bits than the pixel data associated with the graphical objects. In some examples, configuration data may be similar to OpenGL instructions or instructions of another GPU language. Thus, to achieve a bit savings with respect to the number of bits that are sent from source device 120 to sink device 160, source device 120 may send configuration data representing graphical content 518 to sink device 160 rather than pixel-level data. Upon receiving the configuration data, sink device 160 may use the configuration data to render the graphical content 518 at sink device 160. That is, sink device 160 may use the configuration data to render pixel-level data (e.g., RGB values, YCbCr values, or the like) for display.

In some examples, source device 120 may also generate configuration data that includes commands to modify or manipulate graphical content 518 rendered at sink device 160. For instance, if a user provides a user input to source device 120 (e.g., via display 122) to increase the size of a graphical object, source device 120, using techniques of the disclosure may generate configuration data that describes the increase in size. This configuration may be sent to sink device 160, which may use the configuration data to modify and/or manipulate the corresponding graphical content 514. That is, upon receiving the configuration data from source device 120, sink device 160 may use the configuration data to increase the size of the graphical content 518.

In another example, graphical content 518 may be associated with a motion picture or other video. In this example, source device 120 may render graphical content 518 using an application being executed by source device 120. According to aspects of this disclosure, a user may provide user input that causes source device 120 to share graphical content 518 included in the video with sink device 160. The user input may additionally cause graphical controls 526 of the application to be rendered at source device 120, without being rendered at sink device 160. In this way, techniques of the present disclosure may enable source device 120 to render a first portion of graphical content on source device 120 and a second portion of the graphical content on sink device 160. To render the second portion of the graphical content at sink device 160, source device 120 may generate configuration data usable by sink device 160 to render the graphical content. By sending the configuration data to sink device 160, the second portion of graphical content may be rendered at sink device 160.

Moreover, the techniques of the disclosure may provide improved display quality of graphical content shared between source device 120 and sink device 160 in situations in which source device 120 and sink device 160 have different rendering capabilities. In the example shown in FIG. 5, source device 120 may have a lower display resolution than sink device 160. According to aspects of this disclosure, sink device 160 may receive configuration data from source device 120, and utilize the configuration data to generate graphical content 514 in the native resolution of sink device 160. In this way, graphical content 514 may be displayed differently at sink device 160 than source device 120 (e.g., in a higher resolution, an alternative size, and the like).

Figure 6:
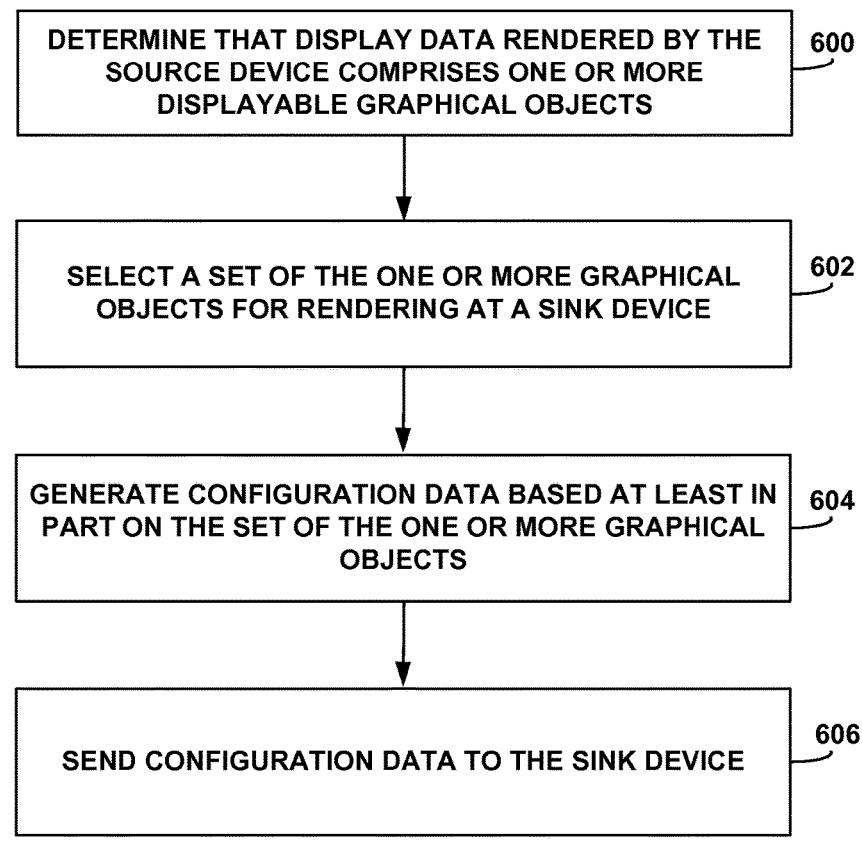
FIG. 6 is a flow diagram illustrating an example method that may enable a source device to communicate with a wireless sink device, according to aspects of this disclosure.

FIG. 6 is a flow diagram illustrating an example method that may enable a source device to generate configuration data usable by a sink device. While the method shown in FIG. 6 may be described with respect to source device 120 and sink device 160 for purposes of explanation, it should be understood that the method of FIG. 6 may be performed by a variety of devices, including other source and/or sink devices.

As shown in FIG. 6, source device 120 may initially determine that display data rendered by source device 120 comprises one or more displayable graphical objects (600). Graphical objects may include, for example, objects comprised of one or more geometric primitives that form a shape for display. Source device 120, in response to determining an event, may select a set of the one or more graphical objects for rendering at sink device 160 (602). For example, an event may be generated in response to a user input. In another example, the event may be generated automatically by an application being executed by the source device 120.

Source device 120 may further generate configuration data based at least in part on the set of the one or more graphical objects (604). In general, configuration data may represent graphical objects without including pixel-level data (e.g., pixel values). Configuration data may require fewer bits than pixel-level data to represent the graphical objects. In some examples, configuration data may be similar to OpenGL instructions or instructions of another GPU language.

According to aspects of this disclosure, the configuration data may be usable by sink device 160 to render representations of the graphical objects in the set of one or more graphical objects. In some examples, source device 120 may generate configuration data based on display parameters of sink device 160. Display parameters may include, for example, display resolution, color bit depth, GPU type, or any other parameters that indicate display capabilities of sink device 160. Thus, source device 120 may generate configuration data that is interpretable by and/or specific to the capabilities and design of a GPU of sink device 160. In some examples, source device 120 may share more of the rendering load with sink device 160 having relatively powerful rendering capabilities than sink device 160 having relatively simplistic rendering capabilities.

Source device 120 may generate any combination of configuration data and pixel-level data for transmission to sink device 160. For example, source device 120 and sink device 160 may operate in various modes. One mode may cause source device 120 to generate only configuration data that represents graphical objects for transmission to sink device 160. Another mode may cause source device 120 to generate only pixel-level display data for transmission to sink device 160. In another mode, source device 120 may generate a combination of pixel-level data for some graphical objects and configuration data for other graphical objects for transmission to sink device 160.

After generating the configuration data, source device 120 may send the configuration data to sink device 160 (606). As described in greater detail with respect to FIG. 7 below, sink device 160 may utilize the configuration data to render the graphical objects represented by the configuration data.

Figure 7:
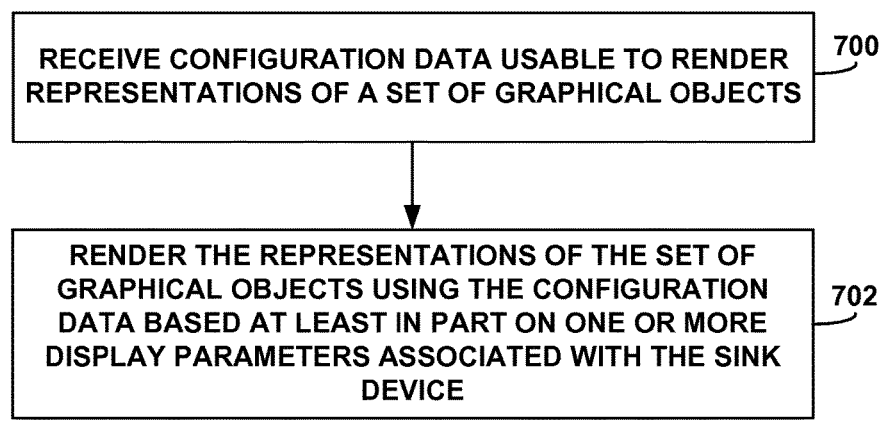
FIG. 7 is a flow diagram illustrating an example method that may enable a wireless sink device to communicate with a source device, according to aspects of this disclosure.

FIG. 7 is a flow diagram illustrating an example method that may enable a sink device to render representations of a set of graphical objects using configuration data from a source device. While the method shown in FIG. 7 may be described with respect to source device 120 and sink device 160 for purposes of explanation, it should be understood that the method of FIG. 7 may be performed by a variety of devices, including other source and/or sink devices.

As shown in FIG. 7, sink device 160 may receive configuration data from source device 120 that is usable by sink device 160 to render representations of a set of graphical objects (700). As noted above, configuration data may represent graphical objects without including pixel-level data (e.g., pixel values), and may require fewer bits than pixel-level data to represent the graphical objects.

In some examples, sink device 160 may render the representations of the set of graphical objects using the configuration data (702). That is, for example, sink device 160 may interpret the configuration data to generate pixel-level data using the configuration data. In some examples, sink device 160 may render the representations based at least in part on one or more display parameters associated with the sink device 160 (702). Display parameters may include display resolution, color bit depth, GPU type, or any other parameters that indicate display capabilities of sink device 160.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a source device, that display data rendered and displayed by the source device comprises one or more displayable graphical objects;
   in response to input, provided at the source device, that corresponds to a set of the one or more graphical objects displayed by the source device, selecting, by the source device, the set of the one or more graphical objects for rendering and displaying at both the source device and a sink device, wherein a size of a display of theسsink device is larger than a size of a display of the source device;
   generating, by the source device, configuration data based at least in part on the set of the one or more graphical objects being rendered and displayed by the source device and based at least in part on one or more display parameters associated with the sink device, wherein the configuration data comprises one or more commands of a graphics programming language that are directly usable by a graphics processing unit (GPU) of the sink device to render pixel-level representations of graphical objects in the set of one or more graphical objects on the sink device; and
   sending, by the source device, the configuration data to the sink device for rendering the set of one or more graphical objects at the sink device.

2. The method of claim 1, wherein the configuration data further comprises at least one of graphical commands to modify the set of one or more graphical objects for rendering at the sink device.

3. The method of claim 2, wherein the graphical commands do not comprise pixel values of a colorspace.

4. The method of claim 1, further comprising:
receiving, by the source device and from the sink device, a display resolution of the display of the sink device;
generating, by the source device, a mapping between the display resolution of the display of the sink device and a display resolution of the display of the source device; and
generating, by the source device, the configuration data based at least in part on the mapping between the display resolution of the display of the sink device and the display resolution of the display of the source device.

5. The method of claim 1, wherein generating configuration data based at least in part on the set of the one or more graphical objects further comprises:
generating, by the source device, configuration data to render the set of the one or more graphical objects only at the sink device.

6. The method of claim 1, wherein the one or more displayable graphical objects comprise a first group of displayable graphical objects and a second group of displayable graphical objects, wherein the method further comprises:
rendering, by the source device, the first group of displayable graphical objects, and wherein the second group of displayable graphical objects comprise the set of the one or more graphical objects for rendering at the sink device.

7. The method of claim 1, wherein the display of the source device comprises a touch sensitive display, the method further comprising:
receiving, at the touch sensitive display of the source device, a first indication of user input;
in response to receiving the first indication, generating, by the source device, a first event based at least in part on the first indication that is associated with a first timestamp;
receiving, by the source device and from the sink device, a second event that is associated with a second timestamp;
determining, by the source device, whether the second timestamp represents an earlier time than the first timestamp; and
when the second timestamp represents the earlier time than the first timestamp, generating, by the source device, configuration data based at least in part on the first timestamp and the second timestamp.

8. The method of claim 1, further comprising:
executing, by the source device, a first application;
determining, by the source device, an indication to execute the first application at the sink device;
in response to determining the indication, determining, by the source device, that a second instance of the application is executable by the sink device at the sink device; and
generating, by the source device, the configuration data to cause the sink device to execute the second instance of the application.

9. The method of claim 1, further comprising:
receiving, by the source device, information specifying processing capabilities of a graphics processing unit (GPU) of the sink device; and
generating, by the source device, the configuration data based at least in part on the capabilities of the GPU of the sink device.

10. A wireless source device comprising:
a display;
one or more processors; and
a non-transitory memory storing instructions that, when executed, cause the one or more processors to:
determine that display data rendered and displayed by the display of the source device comprises one or more displayable graphical objects;
in response to input, provided at the source device, that corresponds to a set of the one or more graphical objects displayed by the display of source device, select the set of the one or more graphical objects for rendering and displaying at both the source device and a sink device, wherein a size of a display of the sink device is larger than a size of the display of the source device;
generate configuration data based at least in part on the set of the one or more graphical objects being rendered and displayed by the source device and based at least in part on one or more display parameters associated with the sink device, wherein the configuration data comprises one or more commands of a graphics programming language that are directly usable by a graphics processing unit (GPU) of the sink device to render pixel-level representations of graphical objects in the set of one or more graphical objects on the sink device; and
send the configuration data to the sink device for rendering the set of one or more graphical objects at the sink device.

11. The wireless source device of claim 10, wherein the configuration data further comprises at least one of graphical commands to modify the set of one or more graphical objects for rendering at the sink device.

12. The wireless source device of claim 11, wherein the graphical commands do not comprise pixel values of a colorspace.

13. The wireless source device of claim 10, wherein, when executed, the instructions further cause the one or more processors to:
receive, from the sink device, a display resolution of the display of the sink device;
generate a mapping between the display resolution of the display of the sink device and a display resolution of the display of the source device; and
generate the configuration data based at least in part on the mapping between the display resolution of the display of the sink device and the display resolution of the display of the source device.

14. The wireless source device of claim 10, wherein, when executed, the instructions further cause the one or more processors to:
generate configuration data to render the set of the one or more graphical objects only at the sink device.

15. The wireless source device of claim 10, wherein, when executed, the instructions further cause the one or more processors to:
render the first group of displayable graphical objects, and wherein the second group of displayable graphical objects comprise the set of the one or more graphical objects for rendering at the sink device.

16. The wireless source device of claim 10, wherein the display of the source device comprises a touch sensitive display, and wherein, when executed, the instructions further cause the one or more processors to:
receive, at the touch sensitive display of the source device, a first indication of user input;

generate, in response to receiving the first indication, a first event based at least in part on the first indication that is associated with a first timestamp;

receive, from the sink device, a second event that is associated with a second timestamp;

determine whether the second timestamp represents an earlier time than the first timestamp; and generate, when the second timestamp represents the earlier time than the first timestamp, configuration data based at least in part on the first timestamp and the second timestamp.

17. The wireless source device of claim 10, wherein, when executed, the instructions further cause the one or more processors to:

execute a first application;

determine an indication to execute the first application at the sink device;

determine, in response to determining the indication, that a second instance of the application is executable by the sink device at the sink device; and generate the configuration data to cause the sink device to execute the second instance of the application.

18. The wireless source device of claim 10, wherein upon execution of the instructions the one or more processors further cause:

receiving information specifying processing capabilities of a graphics processing unit (GPU) of the sink device; and generating the configuration data based at least in part on the capabilities of the GPU of the sink device.

19. A non-transitory computer-readable storage medium storing instructions that upon execution by one or more processors of a wireless source device cause the one or more processors to:

determine that display data rendered and displayed by the source device comprises one or more displayable graphical objects;

in response to input, provided at the source device, that corresponds to a set of the one or more graphical objects displayed by the source device, select the set of the one or more graphical objects for rendering and displaying at the sink device based at both the source device and a sink device, wherein a size of a display of the sink device is larger than a size of a display of the source device;

generate configuration data based at least in part on the set of the one or more graphical objects being rendered and displayed by the source device and based at least in part on one or more display parameters associated with the sink device, wherein the configuration data comprises one or more commands of a graphics programming language that are directly usable by a graphics processing unit (GPU) of the sink device to render pixel-level representations of graphical objects in the set of one or more graphical objects on the sink device; and send the configuration data to the sink device for rendering the set of one or more graphical objects at the sink device.

20. The non-transitory computer readable storage medium of claim 19, wherein the configuration data further comprises at least one of graphical commands to modify the set of one or more graphical objects for rendering at the sink device.

21. The non-transitory computer readable storage medium of claim 20, wherein the graphical commands do not comprise pixel values of a colorspace.

22. The non-transitory computer readable storage medium of claim 19, storing instructions that upon execution by one or more processors of the wireless source device further cause the one or more processors to:

upon receiving, from the sink device, a display resolution of the display of the sink device, generate a mapping between the display resolution of the display of the sink device and a display resolution of the display of the source device; and generate the configuration data based at least in part on the mapping between the display resolution of the display of the sink device and the display resolution of the display of the source device.

23. The non-transitory computer readable storage medium of claim 19, storing instructions that upon execution by one or more processors of the wireless source device further cause the one or more processors to generate configuration data to render the set of the one or more graphical objects only at the sink device.

24. The non-transitory computer readable storage medium of claim 19, storing instructions that upon execution by one or more processors of the wireless source device further cause the one or more processors to render the first group of displayable graphical objects, and wherein the second group of displayable graphical objects comprise the set of the one or more graphical objects for rendering at the sink device.

25. The non-transitory computer readable storage medium of claim 19, wherein the display of the source device comprises a touch sensitive display, and further storing instructions that upon execution by one or more processors of the wireless source device further cause the one or more processors to:

upon receiving, at the touch sensitive display of the source device, a first indication of user input, and in response to receiving the first indication, generate a first event based at least in part on the first indication that is associated with a first timestamp;

upon receiving, from the sink device, a second event that is associated with a second timestamp, determine whether the second timestamp represents an earlier time than the first timestamp; and when the second timestamp represents the earlier time than the first timestamp, generate configuration data based at least in part on the first timestamp and the second timestamp.

26. The non-transitory computer readable storage medium of claim 19, storing instructions that upon execution by one or more processors of the wireless source device further cause the one or more processors to:

execute a first application;

determine an indication to execute the first application at the sink device;

in response to determining the indication, determine that a second instance of the application is executable by the sink device at the sink device; and generate the configuration data to cause the sink device to execute the second instance of the application.

27. The non-transitory computer readable storage medium of claim 19, storing instructions that upon execution by one or more processors of the wireless source device further cause the one or more processors to:

upon receiving information specifying processing capabilities of a graphics processing unit (GPU) of the sink device, generate the configuration data based at least in part on the capabilities of the GPU of the sink device.

28. A wireless source device comprising:
means for determining that display data rendered and displayed by the source device comprises one or more displayable graphical objects;
means for selecting, in response to input, provided at the source device, that corresponds to a set of the one or more graphical objects displayed by the source device, the set of the one or more graphical objects for rendering and displaying at both the source device and the sink device based at a sink device, wherein a size of a display of the sink device is larger than a size of a display of the source device;
means for generating configuration data based at least in part on the set of the one or more graphical objects being rendered and displayed by the source device and based at least in part on one or more display parameters associated with the sink device, wherein the configuration data comprises one or more commands of a graphics programming language that are directly usable by a graphics processing unit (GPU) of the sink device to render pixel-level representations of graphical objects in the set of one or more graphical objects on the sink device; and
means for sending the configuration data to the sink device for rendering the set of one or more graphical objects at the sink device.

29. The wireless source device of claim 28, wherein the configuration data further comprises at least one of graphical commands to modify the set of one or more graphical objects for rendering at the sink device.

30. The wireless source device of claim 29, wherein the graphical commands do not comprise pixel values of a colorspace.

31. The wireless source device of claim 28, comprising:
means for receiving, from the sink device, a display resolution of the display of the sink device;
means for generating a mapping between the display resolution of the display of the sink device and a display resolution of the display of the source device; and
means for generating the configuration data based at least in part on the mapping between the display resolution of the display of the sink device and a display resolution of the display of the source device.

32. The wireless source device of claim 28, comprising:
means for generating configuration data to render the set of the one or more graphical objects only at the sink device.

33. The wireless source device of claim 28, comprising:
means for rendering the first group of displayable graphical objects, and wherein the second group of displayable graphical objects comprise the set of the one or more graphical objects for rendering at the sink device.

34. The wireless source device of claim 28, wherein the display of the source device comprises a touch sensitive display, the wireless source device further comprising:
means for receiving, at the touch sensitive display of the source device, a first indication of user input;
means for generating, in response to receiving the first indication, a first event based at least in part on the first indication that is associated with a first timestamp;
means for receiving a second event that is associated with a second timestamp;
means for determining whether the second timestamp represents an earlier time than the first timestamp; and
means for generating configuration data based at least in part on the first timestamp and the second timestamp, when the second timestamp represents the earlier time than the first timestamp.

35. The wireless source device of claim 28, comprising:
means for executing a first application;
means for determining an indication to execute the first application at the sink device;
means for determining, in response to determining the indication, that a second instance of the application is executable by the sink device at the sink device; and
means for generating the configuration data to cause the sink device to execute the second instance of the application.

36. The wireless source device of claim 28, comprising:
means for receiving information specifying processing capabilities of a graphics processing unit (GPU) of the sink device; and
means for generating the configuration data based at least in part on the capabilities of the GPU of the sink device.

* * * * *